United States Patent
Paschini

(10) Patent No.: US 6,526,130 B1
(45) Date of Patent: Feb. 25, 2003

(54) SYSTEM AND METHOD FOR DISTRIBUTING PERSONAL IDENTIFICATION NUMBERS OVER A COMPUTER NETWORK

(75) Inventor: Miles Paschini, San Diego, CA (US)

(73) Assignee: EWI Holdings, Inc., San Diego, CA (US)

( * ) Notice: Subject to any disclaimer, the term of this patent is extended or adjusted under 35 U.S.C. 154(b) by 114 days.

(21) Appl. No.: 09/619,392

(22) Filed: Jul. 19, 2000

(51) Int. Cl.[7] .............................................. H04M 11/00
(52) U.S. Cl. ................................ 379/93.12; 379/93.17; 379/114.19
(58) Field of Search ........................... 329/93.12, 90.01, 329/93.17, 93.25, 114.19, 114.2, 114.15, 114.17, 144.01, 110.01; 705/56, 58, 72

(56) References Cited

U.S. PATENT DOCUMENTS

| | | | |
|---|---|---|---|
| 5,577,109 A | 11/1996 | Stimson et al. ............. | 379/112 |
| 5,578,808 A | 11/1996 | Taylor ......................... | 235/380 |
| 5,722,067 A | 2/1998 | Fougnies et al. ............ | 455/406 |
| 5,778,313 A | 7/1998 | Fougnies ..................... | 455/406 |
| 5,828,740 A | 10/1998 | Khuc et al. .................. | 379/144 |
| 5,854,975 A | 12/1998 | Fougnies et al. ........... | 455/408 |
| 5,868,236 A | 2/1999 | Rademacher ............... | 194/217 |
| 5,991,380 A | 11/1999 | Bruno et al. ................. | 379/115 |
| 5,991,749 A | 11/1999 | Morrill, Jr. .................. | 705/44 |
| 6,035,025 A | 3/2000 | Hanson ....................... | 379/144 |
| 6,269,343 B1 * | 7/2001 | Pallakoff ..................... | 705/26 |

FOREIGN PATENT DOCUMENTS

| | | | | |
|---|---|---|---|---|
| JP | 410155040 A | * | 6/1998 | .......... H04M/11/00 |
| JP | 411259576 A | * | 9/1999 | .......... G06F/17/00 |

OTHER PUBLICATIONS

Dentilnger; System and method . . . phone services; Dec. 19, 1996; WO 96/41462.*

VENDAPIN Website—www.vendapin.com/5008.html, "VENDAPIN Model 5004 Four Selection Cellular and IP, Phone Calling Card, Lottery or Admissions Ticket Printer Vending Machine With Optional Two Selection Cellular Phone Dispenser Console", Apr. 3, 2000, pp. 1–4.

AFX–Asia, FOCUS, Company News, "Tata Hydro–Electric Q2 to Sept net profit 265.8 min rupees vs 212.4", Oct. 28, 1999, pp. 8–9.

Business Wire, Inc., FOCUS, Business Editors, "The Winner's Edge.com Announces Purchase Agreement", Nov. 1, 1999, pp. 5–6.

Business Wire, Inc., FOCUS, Business Editors, "Easy Wireless Unveils Its Revolutionary Pre–Paid PIN Dispensing Kiosk; Wireless 2000", Feb. 28, 2000, p. 3.

* cited by examiner

Primary Examiner—Melur Ramakrishnaiah
(74) Attorney, Agent, or Firm—Cooley Godward, LLP

(57) ABSTRACT

The present invention comprises a system and method for providing a personal identification number (PIN) to a client terminal over a computer network. In accordance with one aspect of the present invention, a server receives a request for a PIN over a network, the request originating from a user at a client terminal. The request is associated with a requested monetary unit and a requested provider. The server retrieves from a database a PIN associated with the requested monetary unit and requested provider. The server transmits the retrieved PIN to the client terminal over the network, wherein the PIN is transmitted to the client terminal on-demand in response to the customer's request.

27 Claims, 21 Drawing Sheets

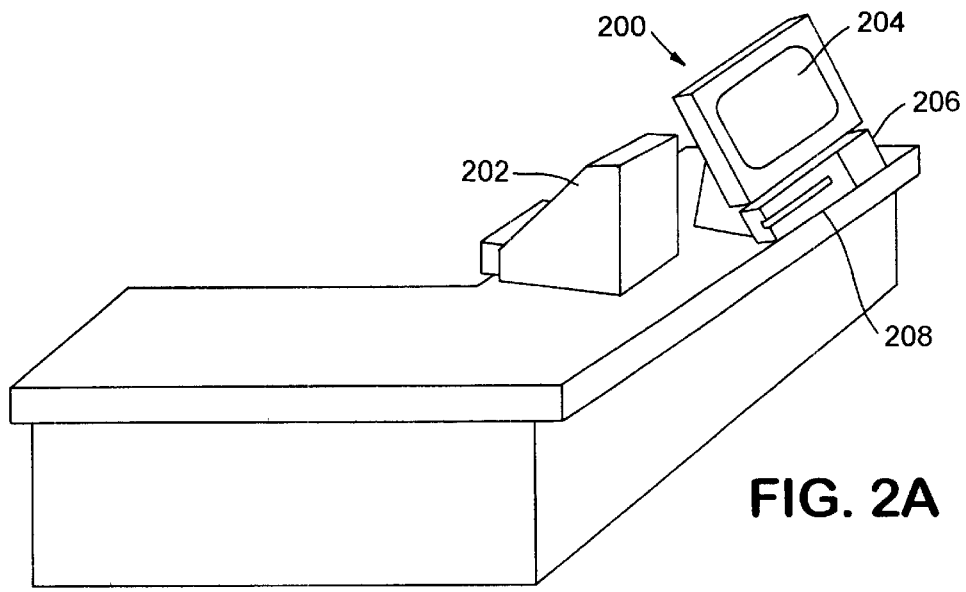
FIG. 2A
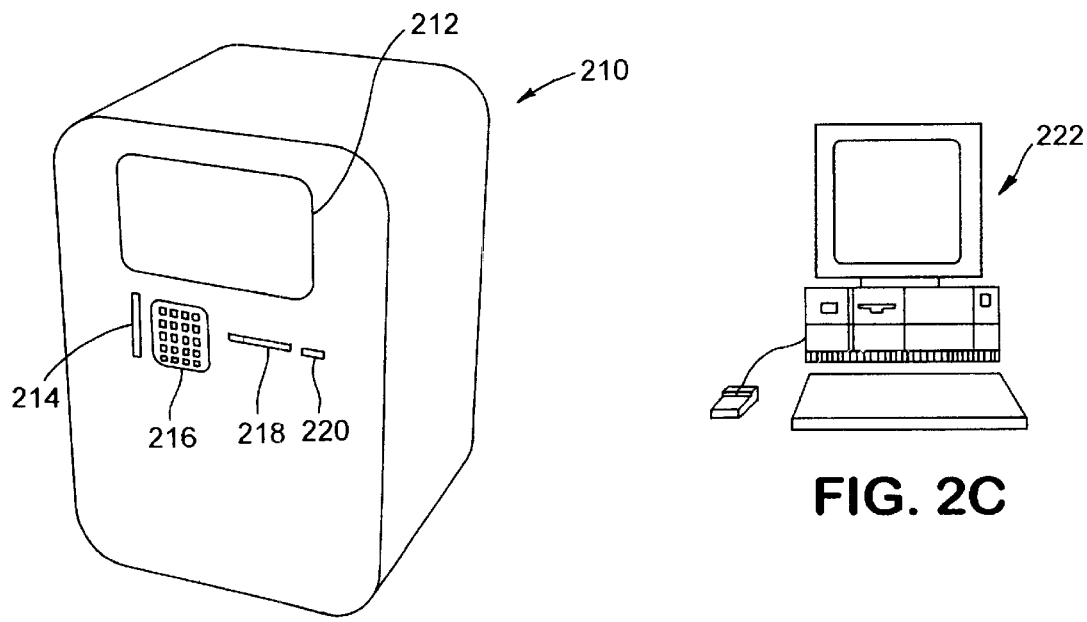
FIG. 2B
FIG. 2C

| PIN DATABASE 112 | | | | | | |
|---|---|---|---|---|---|---|
| | 301<br>GOOD/SERVICE | 302<br>PROVIDER | 304<br>$ VALUE | 306<br>PIN | 308<br>RATE | 310<br>EXPIRATION |
| 312a | Cellular Service | AT&T | $15 | 3456234523 | $0.60/min | 1 month |
| 312b | Cellular Service | AT&T | $15 | 2830525950 | $0.60/min | 1 month |
| 312c | Cellular Service | AT&T | $15 | 9823459754 | $0.60/min | 1 month |
| 312d | Cellular Service | AT&T | $30 | 4575626584 | $0.50/min | 6 months |
| 312e | Cellular Service | AT&T | $30 | 2894754598 | $0.50/min | 6 months |
| | . | . | . | . | . | . |
| 312f | Cellular Service | AIRTOUCH | $50 | 0948574995 | $0.40/min | 1 year |
| 312g | Cellular Service | AIRTOUCH | $50 | 9087423543 | $0.40/min | 1 year |
| 312h | Cellular Service | AIRTOUCH | $50 | 1358909658 | $0.40/min | 1 year |
| 312i | Cellular Service | AIRTOUCH | $100 | 8759187405 | $0.35/min | 1 year |
| 312j | Cellular Service | AIRTOUCH | $100 | 8648767465 | $0.35/min | 1 year |
| 312k | Cellular Service | AIRTOUCH | $100 | 3245105748 | $0.35/min | 1 year |
| | . | . | . | . | . | . |
| 312l | Cellular Service | SPRINT | $25 | 8275098427 | $0.55/min | 6 months |
| 312m | Cellular Service | SPRINT | $25 | 0987451455 | $0.55/min | 6 months |
| 312n | Cellular Service | SPRINT | $50 | 1234870987 | $0.39/min | 6 months |
| 312o | Cellular Service | SPRINT | $50 | 8765230058 | $0.39/min | 6 months |
| 312p | Cellular Service | SPRINT | $100 | 4545454892 | $0.36/min | 6 months |
| | . | . | . | . | . | . |
| 312q | Gasoline | MOBIL | $100 | 1231283950 | Pump Rate | 1 year |
| 312r | Gasoline | MOBIL | $100 | 3458432349 | Pump Rate | 1 year |

FIG. 3

PrePaid Airtime Purchase Ordering System

© 2000 by Powered By Easy Wireless, Inc.
http://www.easywireless.com

Purchase Ordering Model

Purchase Order Data Entry

| Dealer Information: | Payment Method: | Current Balance: |
|---|---|---|
| ABC Communications<br>123 ABC St.,<br>San Diego, CA 91941 | Credit Card: Visa<br>Exp: 02/2002<br>Cardholder Name: John Doe | None |

| Carrier | Region | Card Type | Qty | Wholesale | Totals | Add/Del |
|---|---|---|---|---|---|---|
| [Verizon Wireless] | [Northwest] | [$30 Card] | [5] | $ 25.00 | $ 250.00 | |
| [<Select Carrier>] | [<Select Region>] | [<Select Card>] | [1] | $ --.-- | $ --.-- | |
| | | | | Grand Total: | $ 250.00 | |

Instructions

1) Select a Carrier, Region, Card Type then Enter a Quantity.
2) Confirm your line item by clicking "ADD" at the end of the line.
3) Repeat the process until all the PINs that you wish to purchase are listed.
4) Click "Continue To Summary Screen" to review your order and payment methods.

You *must* click ADD to buy a line item.

To Remove a Line Item: Click "DEL" on the line item you wish to remove.

To Change a Quantity: Change the quantity field to the desired amount, then click "Update Order".

To Cancel the Entire Order: Click "Cancel Order".

If you are having any problems with the system, please send an email to prepaidservice@easywireless.com with a brief description of your problem.

See Next Screen

FIG. 14

Purchase Order Summary

| Dealer Information: | Payment Method: | Current Balance: |
|---|---|---|
| ABC Communications<br>123 ABC St.<br>San Diego, CA 91941 | ACH Maxium:<br>$2,000<br>ACH Min Refresh:<br>$200 | $ 1,000 |

Account Response Window
Previous Balance: $ 1000.00
Amount of Purchase Order: $ 240.00
New Balance: $ 760.00

Purchase Order Summary:

Please review your Purchase Order. If satisfactory, "Submit PO" and your order will be processed and your account charged.

| # | Carrier | Region | Card Type | Qty | Card Cost | Totals |
|---|---|---|---|---|---|---|
| 1 | MCI | Region ABC | $ 5 Card | 5 | $ 3.00 | $ 15.00 |
| 2 | MCI | Region XYZ | $ 30 Card | 3 | $ 20.00 | $ 60.00 |
| 3 | AT&T Wireless | Los Angeles, CA | $ 50 Card | 1 | $ 35.00 | $ 35.00 |
| 4 | AT&T Wireless | Los Angeles, CA | $ 100 Card | 2 | $ 60.00 | $120.00 |
| 5 | Verizon | Louisville, KY | $ 5 Card | 5 | $ 2.00 | $ 10.00 |
|   |   |   |   |   | Grand Total: | $ 240.00 |

1502   1508   1504   1506

If you are having any problems with the system, please send an email to prepaidservice@easywireless.com with a brief description of your problem.

View Alternate Payment Page | View Print Screen

FIG. 15

Purchase Order Summary

Alternate Credit Card Payment Screen
Please Fill In All Fields. Billing Address must match CardHolder name.

Billing Information

Cardholder Name: ☐

Address Line 1: ☐

Address Line 2: ☐

City: ☐

State/Province: ☐

Zip Code: ☐

Credit Card Type: [MasterCard]

Expiration: Month [01] - Year [2000]

Credit Card Number: ☐

Purchase Order Summary:

Please review your Purchase Order. After you submit this order, the following screen will display your PINS and allow you to print them from your browser.

| # | Carrier | Region | Card Type | Qty | Card Cost | Totals |
|---|---|---|---|---|---|---|
| 1 | MCI | Region ABC | $ 5 Card | 5 | $ 3.00 | $ 15.00 |
| 2 | MCI | Region XYZ | $ 30 Card | 3 | $ 20.00 | $ 60.00 |
| 3 | AT&T Wireless | Los Angeles, CA | $ 50 Card | 1 | $ 35.00 | $ 35.00 |
| 4 | AT&T Wireless | Los Angeles, CA | $ 100 Card | 2 | $ 60.00 | $120.00 |
| 5 | Verizon | Louisville, KY | $ 5 Card | 5 | $ 2.00 | $ 10.00 |
| | | | | | Grand Total: | $ 240.00 |

FIG. 16

Purchase Receipt Summary

Thank You For Your Purchase!

PRINT THIS PAGE IMMEDIATELY FOR YOUR RECORDS.
A copy of this receipt WITHOUT PINS will be emailed to your account for your records.

Purchase Order Summary
Dealer Name: XYZ Wireless
Dealer ID: 515432
Payment Type Used: ACH
Previous Account Balance: $ 1,000.00
Total Amount of Purchase Order: $ 390.00
New Balance: *$ 610.00*
Transaction Date: 02/15/2000
Transaction Number: 1554987745234

The following list of PINS were purchased:

| Carrier | Region | Card Type | PINS |
|---|---|---|---|
| MCI | Region ABC | $ 5 Card | 2165498465132132 |
| MCI | Region ABC | $ 5 Card | 9815654198510522 |
| MCI | Region ABC | $ 5 Card | 6851096519865241 |
| MCI | Region ABC | $ 5 Card | 9854103541524854 |
| MCI | Region ABC | $ 5 Card | 9651068352741551 |
| MCI | Region XYZ | $ 30 Card | 1321319849515216 |
| MCI | Region XYZ | $ 30 Card | 9541687418524156 |
| MCI | Region XYZ | $ 30 Card | 3249864138787496 |
| AT&T Wireless | Los Angeles, CA | $ 50 Card | 2165165165135165 |
| AT&T Wireless | Los Angeles, CA | $ 100 Card | 8546165165165165 |
| AT&T Wireless | Los Angeles, CA | $ 100 Card | 3549818743184945 |
| Verizon | Louisville, KY | $ 5 Card | 9816519819851565 |
| Verizon | Louisville, KY | $ 5 Card | 6549806541635241 |
| Verizon | Louisville, KY | $ 5 Card | 8541216854210556 |
| Verizon | Louisville, KY | $ 5 Card | 1354135054198604 |
| Verizon | Louisville, KY | $ 5 Card | 8754040567418653 |

If you are having any problems with the system, please send an email to prepaidservice@easywireless.com with a brief description of your problem.

FIG. 17

Prepaid Cellular PIN Ticket

Carrier: AT&T Wireless

Region: National

PIN Number: 189465216548951

Card Type: $ 30 Card

Expiration: 60 Days from date of Ticket

Ticket Date: 06/05/2000

Long Distance Rate: $ 0.12 per minute

Roaming Rate: $ 0.59 per minute

1916
- Sub/Kiosk ID #
- Kiosk_Name an
- Kiosk_Icon an
- Kiosk_Contact_First an
- Kiosk_Contact_Last an
- Kiosk_Contact_Phone1 an
- Kiosk_Contact_Phone2 an
- Kiosk_Contact_Fax an
- Kiosk_Contact_Email an
- Kiosk_Mailing_Address1 an
- Kiosk_Mailing_Address2 an
- Kiosk_Mailing_City an
- Kiosk_Mailing_State an
- Kiosk_Mailing_ZIP an
- Kiosk_Mailing_Province an
- Kiosk_Mailing_Country an
- Kiosk_Billing_Contact_First an
- Kiosk_Billing_Contact_Last an
- Kiosk_Billing_Contact_Phone1 an
- Kiosk_Billing_Contact_Phone2 an
- Kiosk_Billing_Contact_Fax an
- Kiosk_Billing_Contact_Email an
- Kiosk_Billing_Mailing_Address1 an
- Kiosk_Billing_Mailing_Address2 an
- Kiosk_Billing_Mailing_City an
- Kiosk_Billing_Mailing_State an
- Kiosk_Billing_Mailing_ZIP an
- Kiosk_Billing_Mailing_Province an
- Kiosk_Billing_Mailing_Country an
- Kiosk_Markup_Percent %
- Kiosk_Federal_Tax_ID num
- Kiosk_SSN num
- Kiosk_Credit_Card_Number num
- Credit_Card_ID #
- Kiosk_Credit_Card_Exp date
- Kiosk_Credit_Card_Cardholder_Billing_First an
- Kiosk_Credit_Card_Cardholder_Billing_Last an
- Kiosk_Credit_Card_Cardholder_Billing_Address1 an
- Kiosk_Credit_Card_Cardholder_Billing_Address2 an
- Kiosk_Credit_Card_Cardholder_Billing_City an
- Kiosk_Credit_Card_Cardholder_Billing_State an
- Kiosk_Credit_Card_Cardholder_Billing_ZIP an
- Kiosk_Wallet_Balance curr
- Kiosk_Wallet_Refresh curr
- Kiosk_Wallet_Max curr
- Kiosk_Bank_Routing_Number curr
- Kiosk_Bank_Account_Number curr
- Kiosk_Credit_Account_Limit curr
- Kiosk_Credit_Account_Balance curr
- Kiosk_Approved_Carriers list
- Kiosk_Approved_Regions list
- Kiosk_Approved_Denominations list
- Kiosk_UserName an
- Kiosk_Password an
- Payment_Method_ID #
- Dealer_ID #
- POS Type ID #

1918
- POS Type ID #
- Public Kiosk
- Sub Dealer
- Counter Kiosk

1920
- Payment_Method ID #
- Credit Card
- ACH Wallet
- Cash
- Credit Account

1922
- Credit Card ID #
- Visa
- Mastercard
- AMEX
- Discover

1924
- Employee_ID #
- Employee_First
- Employee_Last
- Internal_ID Number
- Commission %
- Quota
- Bonus %
- Bonus Rate
- Bonus Quota

SYSTEM AND METHOD FOR DISTRIBUTING PERSONAL IDENTIFICATION NUMBERS OVER A COMPUTER NETWORK

FIELD OF THE INVENTION

The present invention generally relates to a system and method for allowing customers and businesses to purchase pre-paid goods and services. The present invention more specifically relates to a system and method for distributing personal identification numbers (PINs) for access to pre-paid goods and services to users over a computer network.

BACKGROUND OF THE INVENTION

There currently exist "pre-paid" telephone cards that allow a customer to purchase a desired amount of long-distance telephone time from a particular telephone service provider. These pre-paid telephone cards are often sold by dealers such as convenience stores or wireless phone stores. Pre-paid telephone cards are also often sold in airports. Vending machines for selling pre-paid telephone cards also have been developed. Each of these pre-paid telephone cards has a specific monetary denomination. For example, a customer could purchase a $10 card, a $20 card, or a $100 card. These pre-paid telephone cards are sold by particular telephone service providers such as AT&T, MCI, Sprint, etc. A customer could, for example, buy a $20 MCI card, which would entitle him or her to $20 worth of long-distance calling service provided by MCI. These cards are referred to as "pre-paid" because the customer purchases the long-distance time before he or she actually places the call. This is in contrast to the more typical post-pay service that most telephone customers use with the telephone in their residence or office. With post-pay service, customers are sent a bill on a periodic basis. The customer pays for calls that have already been made, rather than calls that will be made in the future.

Frequently, the pre-paid telephone cards that are sold by dealers or vending machines are of the "scratch-off" type. After the customer purchases a card, he or she can scratch off a layer of material which reveals a personal identification number (PIN). The layer of scratch-off material hides the PIN from customers browsing in the store who have not purchased the card. After a customer purchases a card and scratches off the layer of material, the customer can then use the card to place a long-distance call. When the customer wishes to place a long-distance call, he or she dials a special number provided by the telephone service provider. The customer then enters the PIN written on the card. The long distance provider automatically debits the charge of the call from an account associated with the PIN.

As an example, a customer could purchase a $10 MCI card. After the customer rubs off the layer of material, a PIN number 129384348764 is revealed. When the customer wishes to place a long-distance call, the customer dials an MCI access number. The customer then enters PIN 129384348764. The long-distance carrier, MCI, identifies the PIN and recognizes that there is $10 worth of credit in this account. If the customer places a call which lasts 5 minutes and costs 4$, MCI will debit the account so that $6 remains. The next time the customer places a call using that PIN number, the system will find that $6 remains in the account associated with that PIN.

One problem with these pre-paid phone cards is that the cards present a major inventory headache for dealers. There is a lot of work and expense associated with maintaining a filled inventory of cards. First, the dealer or vending machine operator has to predict which cards will be in demand and determine how many cards of each denomination to order for each of various providers. The dealer then has to pay for the desired inventory of cards up front, which requires a significant cash outlay. The dealer then has to keep track of how many cards are left in stock for each service provider and of each different monetary denomination, and determine when to order a new batch of cards. All of these costs associated with filled inventory can be time consuming and expensive for dealers.

Another problem is that these pre-paid telephone cards are especially vulnerable to theft, loss, and other inventory "shrinkage." Because the cards are small, it is easy for a shoplifter to pocket a card unnoticed. Since these cards have a high value to them and are so easy to pocket, dealers which sell these cards are extremely vulnerable to inventory shrinkage.

Vending card machines have been proposed which store personal identification numbers (PINs) in a memory in the machine. A customer can then purchase a pre-paid telephone PIN by inserting cash into the machine. The machine can replenish its stock of PINs when the memory runs out of PINs or on a periodic basis by accessing a remote store of PINs via a modem.

The problem with these vending machines is that there are still significant costs associated with inventorying the PINs. The PINs are retained in a memory in the machine which has a similar effect to storing cards. Once a PIN has been stored in the memory of a particular machine, that PIN becomes unavailable to be used by any other dealer, even if the PIN is never purchased. Additionally, if the machine were to break, or the memory were to be erased, there is a problem determining who is responsible for paying for the PINs that were contained in the memory. Additionally, decisions must still be made how many PINs to store in memory, what monetary denominations to store in memory, and for which providers to store PINs in memory. Therefore, there are still significant inventory costs associated with storing the PINs in the vending machine. Additionally, these proposed vending machines do not provide consumers the ability to obtain a PIN from the convenience of their homes or offices.

Another system which has been proposed is a web site which is accessed over the Internet. A customer can go to this web site and purchase pre-paid telephone service. A PIN is then e-mailed to the customer's e-mail address. The problem with this service is that a customer must be able to access his or her email account in order to obtain the PIN. Additionally, e-mail is often unsecure. If a computer hacker is "listening in" on an individual's email, then the hacker can steal the PIN and use it for his own purposes. Additionally, if a customer is purchasing a PIN in a convenience store or an airport, the customer will probably not have access to his or her e-mail account. The customer may have to wait to return to his or her home or office to access the PIN. Additionally, e-mail can sometimes be slow and it may take hours or days to retrieve the message from the customers Internet Service Provider (ISP).

What is needed is a secure system that provides PINs for pre-paid goods and services conveniently to customers. What is also needed is a system that relieves dealers such as convenience stores and vending machine operators from the costs associated with maintaining a filled inventory of pre-paid cards and PINs. What is also needed is a system that allows consumers to select from a wide-range of providers and monetary denominations without requiring the dealer to maintain a large filled inventory of cards or predict which type of cards or PINs to order. What is also needed is a secure system for selling pre-paid goods and services which is less vulnerable to theft and other inventory shrinkage. What is also needed is a system that can peform real-time distribution and accounting of personal identification numbers.

SUMMARY OF THE INVENTION:

The present invention allows a customer to purchase pre-paid amounts of any good or service, such as telephone service, gasoline, electricity, dry-cleaning, bus service, subway service, magazines, newspapers, or bundled goods and services. After the customer purchases a pre-paid amount of a good or service, the customer receives a personal identification number (PIN) which is downloaded in real-time over a network such as the Internet. The PIN is provided over the network "on-demand," meaning that the PIN is downloaded over the network immediately or very soon after receiving a request and payment from the customer. The PIN is downloaded over a network in response to the customer's request, not delivered to the customer hours or days after the request. The PIN is not stored locally at the client terminal used by the customer, but is downloaded over the Internet, thus eliminating any inventory tasks or costs associated with maintaining a filled inventory for the dealer. After the customer receives the PIN, the customer can then use this PIN at any convenient time to access the desired good or service.

The present invention thus provides "virtual inventory" of pre-paid cards because it removes all the burdens of inventorying pre-paid cards from the dealer. Additionally, it provides "virtual distribution" of telephone cards, because the service providers no longer have to manufacture pre-paid cards and distribute them to the dealers. Because the PINs are delivered on-demand, the present invention provides real-time distribution and accounting. Additionally, the present invention eliminates the inventory shrinkage problem created by the loss and theft of pre-paid cards.

The present invention comprises a system and method for providing a personal identification number (PIN) to a client terminal over a computer network. The invention eliminates all costs associated with filled inventory for dealers selling PINs. In accordance with one aspect of the present invention, a server receives a request for a PIN over a network, the request originating from a user at a client terminal. The request is associated with a requested monetary unit and a requested provider. The server retrieves from a database a PIN associated with the requested monetary unit and requested provider. The server transmits the retrieved PIN to the client terminal over the network, wherein the PIN is transmitted to the client terminal on-demand in response to the customer's request. No inventory of PINs is stored at the client terminal. All transmissions between the client terminal and the server are by secure transmission to prevent an eavesdropper from stealing the PIN(s).

The PIN can be used for accessing pre-paid telephone service. Alternatively, the PIN can be used for accessing other pre-paid goods and services such as gasoline, magazines, subway service, etc.

The server can transmit to the client terminal a plurality of products or services available. The server then receives from a user at the client terminal a selection of one of the available products or services. The server transmits to the client terminal a plurality of provider names for the requested product or service. The server receives from a customer at the client terminal a selection of one of the available provider names. The server transmits to the client terminal a plurality of monetary denominations available for the requested provider. The server receives from the client terminal a selection of one of the available monetary denominations. The server transits to the client terminal a plurality of regions available for the requested provider. The server receives from the client terminal a selection of the one of the available regions. The server can receive a request from the client terminal to view rate information. The server then transmits rate information to the client terminal.

The user is then prompted at the client terminal to enter payment for the requested PIN. The user can enter payment a) inserting cash into a receptacle at the client terminal, or b) entering credit card or debit card or smart card information or swiping a card through a receptacle, or c) paying cash to an operator associated with the client terminal. If the user pays a dealer, the dealer remits a portion of the payment to an account associated with the server by a) transferring funds from a dealer's account into the account associated with the server by an electronic funds transfer, or b)charging a portion of the payment to a dealer's credit account, or c) charging a portion of the payment to a dealer's credit card.

After the user pays for one or more PINs, the client terminal prints a receipt for the customer, the receipt including the requested PIN number and instructions for using the PIN.

The present invention also includes a purchase ordering method whereby a dealer can buy PINs in bulk and receive a wholesale discount. The dealer can place multiple individual purchase orders at once, each individual purchase order associated with a requested provider, a requested monetary denomination, and a requested number of PINs.

BRIEF DESCRIPTION OF THE DRAWINGS

FIG. 2A depicts a picture of a dealer-located embodiment of a client terminal.

FIG. 2B depicts an automated kiosk embodiment of a client terminal.

FIG. 2C depicts a personal computer embodiment of a client terminal.

FIG. 3 depicts a simplified example of a database record.

FIG. 14 depicts an example of a display screen shown to a user for entering data into a purchase order.

FIG. 15 depicts an example of a purchase order summary screen.

FIG. 16 depicts an example of a screen shown to a user for entering alternate credit card information.

FIG. 17 depicts an example of a purchase receipt summary screen for the purchase ordering sytem.

FIG. 18 shows an example of a prepaid cellular PIN receipt/ticket.

FIGS. 19A and 19B shows an example of a more detailed database record.

DETAILED DESCRIPTION OF THE INVENTION

The present invention allows a customer to purchase pre-paid amounts of any good or service, such as telephone service, gasoline, electricity, dry-cleaning, bus service, subway service, magazines, newspapers, or bundled goods and services. After the customer purchases a pre-paid amount of a good or service, the customer receives a personal identification number (PIN) which is downloaded in real-time over a network such as the Internet. The PIN is provided over the network "on-demand," meaning that the PIN is downloaded over the network immediately or very soon after receiving a request and payment from the customer. The PIN is downloaded over a network in response to the customer's request, not delivered to the customer hours or days after the request. The PIN is not stored locally at the client terminal used by the customer, but is downloaded over the Internet, thus eliminating any inventory tasks or costs associated with maintaining a filled inventory for the dealer. After the customer receives the PIN, the customer can then use this PIN at any convenient time to access the desired good or service.

The present invention thus provides "virtual inventory" of pre-paid cards because it removes all the burdens of inventorying pre-paid cards from the dealer. Additionally, it provides "virtual distribution" of telephone cards, because the service providers no longer have to manufacture pre-paid cards and distribute them to the dealers. Additionally, the present invention eliminates the inventory shrinkage problem created by the loss and theft of pre-paid cards.

Figure 1:
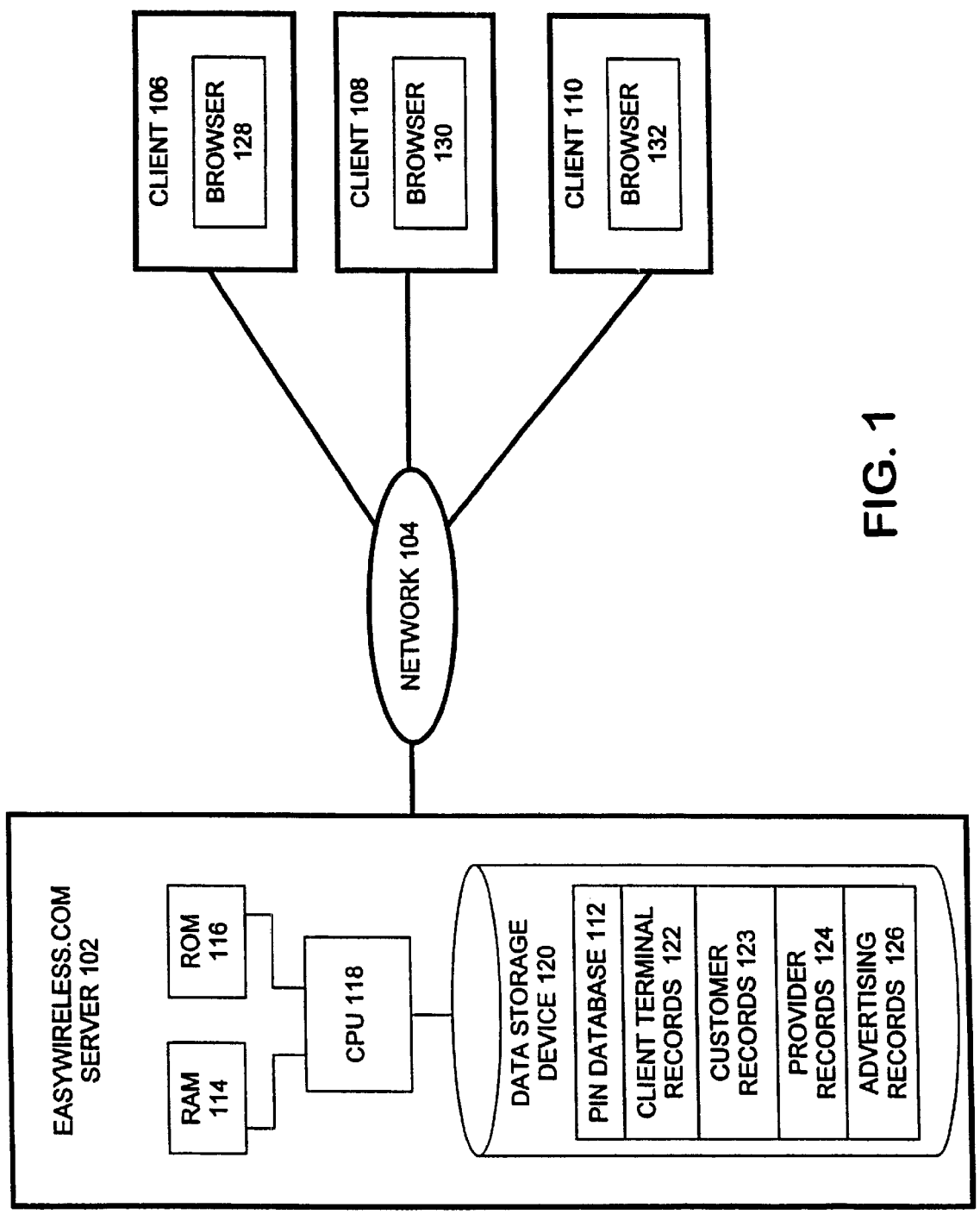
FIG. 1 depicts a block diagram of a system architecture suitable for implementing the method of the present invention.

FIG. 1 depicts a block diagram of the system of the present invention. Easywireless.com server 102 is coupled to network 104. Server 102 can be any large computer or network device. The name "Easywireless.com" used herein in conjunction with server 102 is used by way of example only, and is not intended to in any way limit the range of servers that can be used with the present invention. For purposes of example only, "Easywireless.com" server 102 refers to a server associated with the company Easywireless, Inc.

Network 104 can be any network connecting computers such as the Internet. Client terminals 106, 108, and 110 are running browser programs 128, 130 and 132, respectively. Browsers 128, 130, and 132 are any program that allows client terminals 106, 108, and 110 to access Easywireless.com server 102 over network 104.

Easywireless.com server 102 contains RAM 114, ROM 116, CPU 118, and data storage device 120. CPU 188 runs the software which is operating the method of the present invention depicted in FIG. 2. Data storage device 120 contains a personal identification number (PIN) database 112. PIN database 112 stores PINs which are available for purchase by customers. The PIN provides access to a pre-paid amount of a good or a service. PIN database 112 is described in more detail with respect to FIG. 3.

Data storage device 120 also includes client terminal records 122. Client terminal records store information concerning where client terminals are located. Client terminal records 122 can store any information specific to specific client terminals, such as previous purchase history, payment and account information, and terminal preferences.

Data storage device also includes customer records 123. Customer records 123 provide information unique to individual customers. For example, as will be discussed later with respect to FIG. 2C, customers can access Easywireless.com server 102 through a home personal computer. Customers can identify themselves and provide identifying information. Easywireless.com 102 can use this information to provide better service to the customer, to target advertising to the customer, or to store payment or credit accounts. When a customer accesses Easywireless.com server 102 from a client terminal in a retail store, in most instances the customer will prefer to remain anonymous. In this case, Easywireless.com server 102 will not store any customer information in customer records 123.

Data storage device 120 also contains provider records 124. These records contain information pertinent to providers who are providing PINs for PIN database 112. For example, these records can contain addresses, billing information, and telephone numbers. Data storage device 120 also contains advertising records 126. Advertising records 126 contain information about advertising banners and links that can be provided to client terminals 106, 108 and 110 as an additional source of revenue.

Because the PINs are valuable and could be subject to theft and copying by electronic piracy, communications over network 104 between Easywireless.com server 102 and client terminals 106, 108 and 110 is protected by the use of encrypted communications and well-known security techniques. Client terminals 106, 108, and 110 can provide security certificates to Easywireless.com server 102 to authenticate their transmissions.

FIGS. 2A–2C depict three alternative physical embodiments of client terminals 106, 108 and 110 FIG. 2A depicts a physical embodiment which is used in a typical checkout counter of a store, such as a convenience store. Client terminal 200 of this embodiment includes a touch-screen 204. Various options appear on touch-screen 204, which a customer may activate by touching an appropriate location on touch-screen 204. A customer makes payment by paying cash to a store clerk operating cash register 202. Alternatively, a customer can pay with a credit card by swiping a credit card through credit card slot 208. Buttons 206 can be used by the customer in addition to touch-screen 204 to make additional selections, such as choosing a particular type of credit card.

FIG. 2B depicts an alternative physical embodiment for the client terminal, automated kiosk 210. Automated kiosk 210 includes a touch-screen 212. Credit card receptor 214 allows a consumer to submit payment by inserting a credit card. Alternatively, the customer can insert bills into bill receptor 218, or coins into coin receptor 220. The customer can optionally make selections by entering data on keypad 216 in addition to making selections with touch-screen 212.

FIG. 2C depicts another alternative physical embodiment for a client terminal. Personal computer 222 can be used in the convenience of a customer's home or office to access the Easywireless.com web server, by entering an appropriate URL in the customer's browser (for example, http://www.Easywireless.com). The customer can then purchase PIN(s) from Easywireless.com from the customer's personal computer 222.

FIG. 3 depicts a simplified example of records within PIN database 112. Another, more detailed example of records within PIN database 112 is described later with respect to FIGS. 19A and 19B. PIN database 112 stores PINs which are available for purchase by customers. PIN database 112 contains records 312. Good/Service field 301 specifies the name of a good or service which is available for pre-paid purchase. For example, records 312*a*–312*p* shown in FIG. 3 contain PINs which provide access to pre-paid cellular service. Records 312*q*–*r* shown in FIG. 3 contain PINs which provide access to pre-paid gasoline. Other goods and services can be also be included in PIN database 112 such as electricity, cable service, satellite TV, etc.

Provider field 302 contains the name of the particular good or service provider associated with the record. For example, FIG. 3 shows records for AT&T, AIRTOUCH, SPRINT, and MOBIL. Value field 304 specifies the dollar value associated with each record. For example, record 312*h* provides a customer with $50 of pre-paid cellular service from AIRTOUCH. PIN field 306 specifies the PIN which is provided to the customer and allows access to the good or service. Rate field 308 specifies a rate associated for each record. For example, for cellular telephone service rate field 308 specifies the calling rate associated with the record. In the example PIN database 112 shown in FIG. 3, rate field 308 is not used for gasoline records 312*q* and 312*r*, since the gasoline rate is determined at the pump.

Expiration field 310 contains an expiration date beyond which the PIN for that record will no longer be valid. Other fields may also be added. Some fields may be particular to a specific good or service. For example, if gasoline is being sold then there may be a field for "Octane" which specifies the octane level of gasoline being purchased.

Figure 4A:
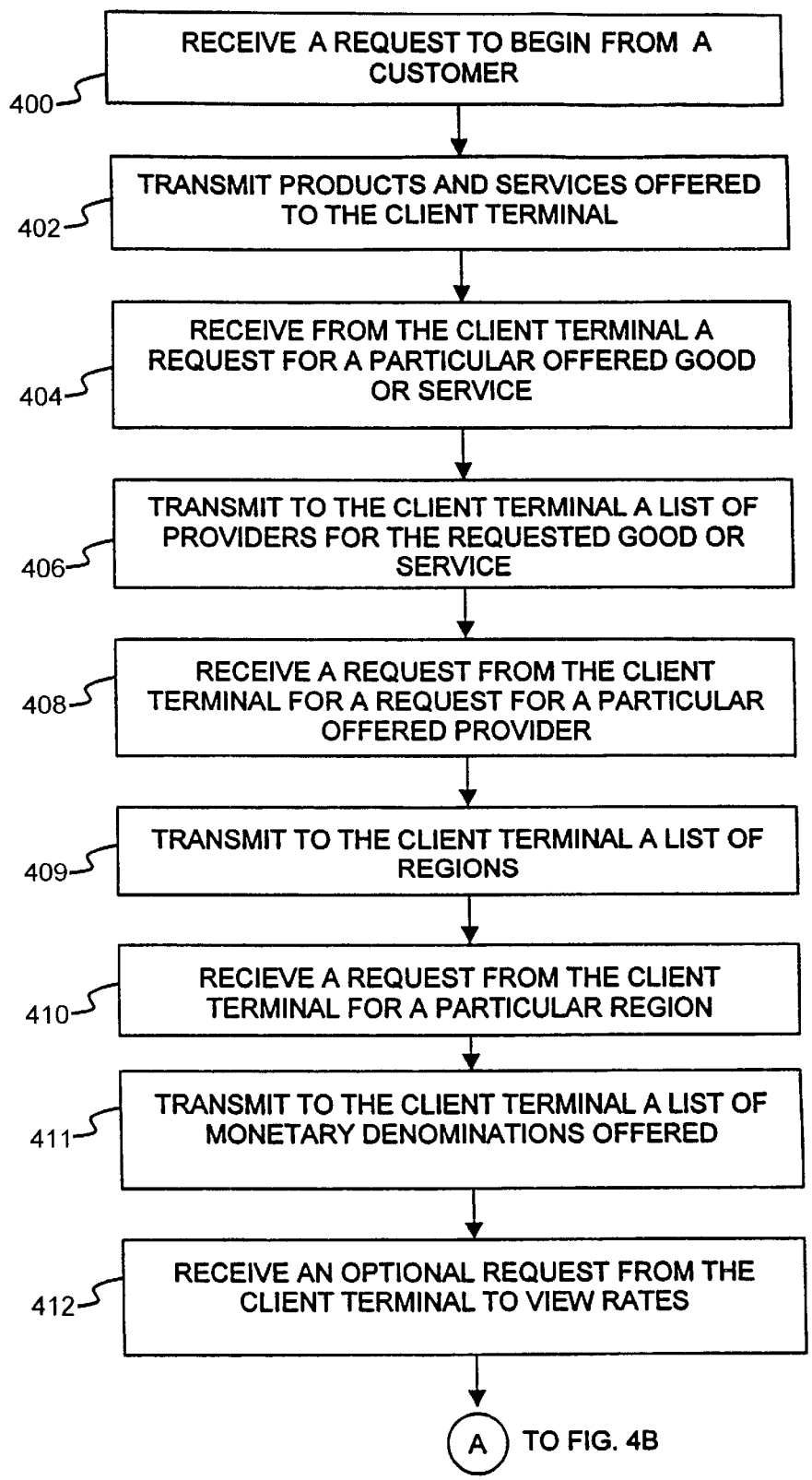
FIGS. 4A and 4B depict a flowchart illustrating a method of purchasing one or more PINs using the system of the present invention.
Figure 4B:
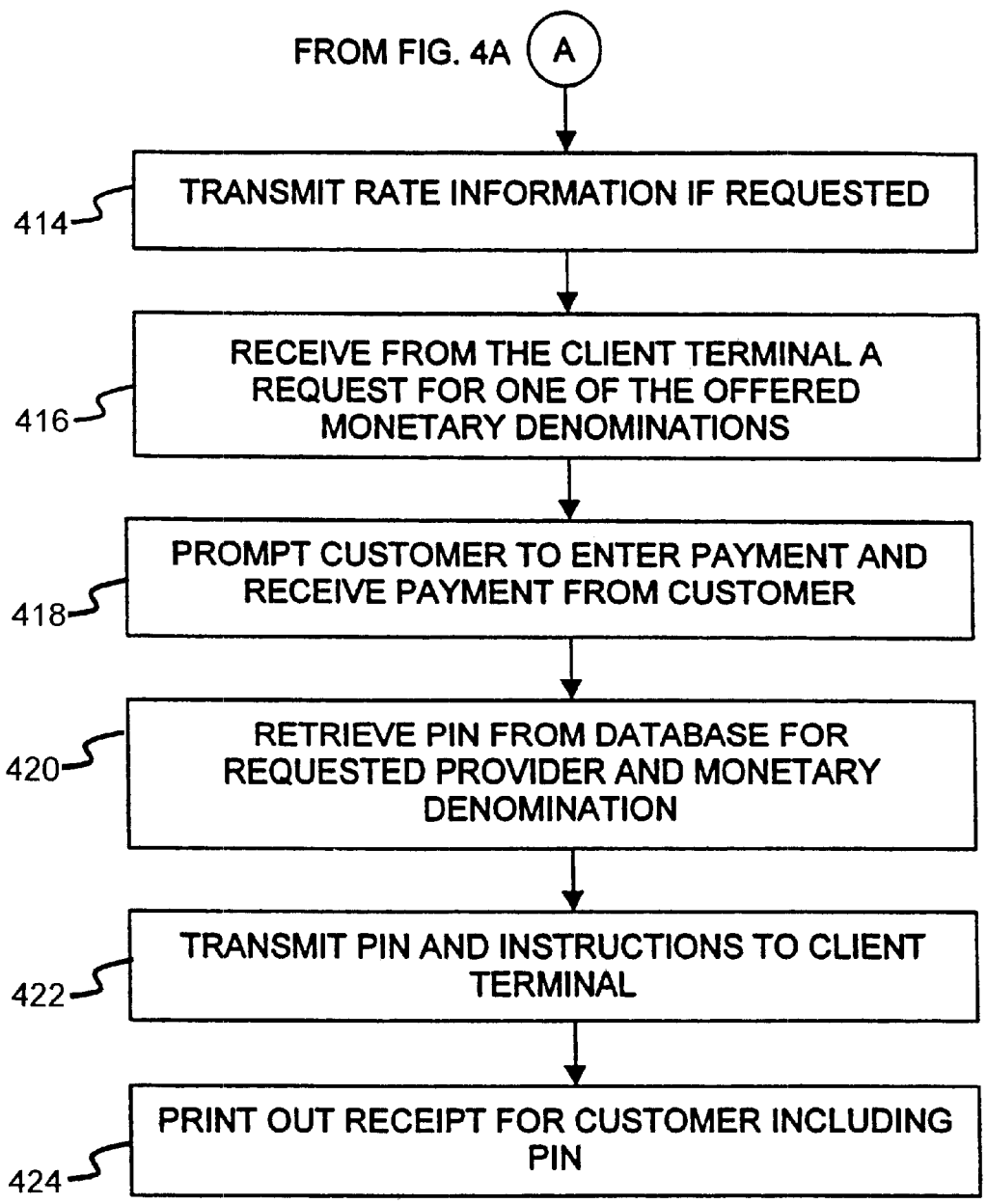

FIG. 4A depicts a flowchart illustrating a method of operating Easywireless.com server 102. Initially, in step 400, the Easywireless.com server receives a request from a customer to begin. For example, a customer entering a retail store approaches client terminal 200 shown in FIG. 2A. A "BEGIN" Window displayed on touch-screen 204 reads "Touch here to begin." The customer approaches the touch-screen 204 and touches the BEGIN Window. This sends a request to begin to Easywireless.com server 102.

In step 402, in response to receiving a request to begin, Easywireless.com server 102 transmits to the client terminal a list of products and services offered. For example, Easywireless.com server 102 could transmit: 1) cellular telephone service, 2) long-distance telephone service, 3) electricity, 4) gasoline, and so on. All of these goods and services would be available to the customer to purchase on a pre-paid basis. The list of products and services transmitted to the client terminal appears, for example, on touch-screen 204 shown in FIG. 2A. The customer then touches a desired good or service on touch-screen 204. This sends a request for the chosen good or service back to Easywireless.com server 102. For example, the customer selects "cellular telephone service."

In step 404, Easywireless.com server 102 receives the request from the client terminal for the chosen good or service. In this example, Easywireless.com server 102 receives a request for cellular telephone service. In step 406, the Easywireless.com server 102 transmits to the client terminal a list of providers for the requested good or service. For example, if the customer has requested cellular telephone service, Easywireless.com server 102 transmits a list of: AT&T, AIRTOUCH, and SPRINT. The customer then selects one of these offered providers by touching an option on touch-screen 204. This would send a request back to Easywireless.com server 102 for a particular requested provider. For example, the customer could select "AIRTOUCH."

In step 408, Easywireless.com server 102 receives the customer's request for the particular provider requested.

In step 409, Easywireless.com server 102 transmits to the client terminal a list of regions for the requested good or service. For example, if the customer requested "AIRTOUCH" in step 408, then Easywireless.com server 102 would transmit a list of regions such as "AIRTOUCH NORTHEASTERN U.S.," or "AIRTOUCH NEW YORK CITY METROPOLITAN REGION," OR "AIRTOUCH PACIFIC REGION," etc. In step 410, Easywireless.com server 102 receives the customer's request for a particular region.

In step 411, Easywireless.com server transmits a list of pre-paid monetary denominations offered. For example, if a request for "AIRTOUCH" is received, Easywireless.com might offer pre-paid cellular service for AIRTOUCH in the following monetary denominations: $10, $20, $50, and $100. Thus a customer could choose to buy a $50 "virtual" phone card which would provide him or her with $50 of pre-paid cellular service.

The Easywireless.com server 102 can determine what monetary denominations are available by one of the following methods. As a first method, Easywireless.com server 102 checks provider records 124, and looks up the record corresponding to the chosen provider (for example, AIRTOUCH). Easywireless.com 102 then checks a field of the provider record to determine what monetary values are offered. As a second method, Easywireless.com server 102 checks PIN database 112, and determines what types of monetary denominations are available. For example, Easywireless.com server 102 can determine that it is presently out of stock of $50 AIRTOUCH PINs, but Easywireless.com server 102 has available $10 PINs, $20 PINs, and $100 PINs. As an example, the customer could choose to purchase a $50 PIN from AIRTOUCH. The customer would receive a PIN which would allow him or her to purchase $50 of cellular telephone service.

As an alternative to transmitting a list of offered monetary denominations, in step 410, the customer could alternatively be allowed to simply type in at a keypad a desired amount of service that he or she desires. For example, a message would appear on touch-screen 204 stating "TYPE IN AN AMOUNT OF PRE-PAID SERVICE YOU WISH TO PURCHASE." The customer could then type in, for example, $50. Easywireless.com server 102 could then check PIN database 112 to see if it had any $50 PIN denominations available. If there was no $50 PINs available, Easywireless.com server 102 could, for example, transmit a message stating "THERE ARE NO $50 PINS AVAILABLE. WOULD YOU LIKE TO PURCHASE A $40 PIN OR A $75 PIN?" Alternatively, Easywireless.com server 102 could transmit a message stating "THERE ARE NO $50 PINS AVAILABLE FOR AIRTOUCH. HOWEVER, SPRINT AND MCI OFFER $50 PINS FOR CELLULAR TELEPHONE SERVICE. WOULD YOU LIKE TO PURCHASE FROM ONE OF THESE PROVIDERS?"

The customer can also be given an option to "View Rates." If the customer chooses this option, then a request to view rates is sent to the Easywireless.com server 102. In step 412, the request is received by Easywireless.com server 102. In step 414, Easywireless.com server 102 transmits rate information to the client terminal. For example, the rate information could specify that a $100 "virtual" pre-paid phone card purchased from AIRTOUCH has a cellular calling rate of $0.35 per minute, and the PIN expires in 6 months. A $50 virtual pre-paid phone card purchased from AIRTOUCH has a cellular calling rate of $0.40 per minute, and the PIN expires in 8 months. Providers may choose to offer lower rates for larger pre-paid purchases as a high volume discount. Further information can also be requested and provided to the customer depending on the particular product or service purchased. For example, if the customer is purchasing gasoline, the customer could request current price per gallons at various gas station locations for various octane levels.

In step 416, Easywireless.com server 102 receives from the client terminal a request for one of the available monetary denominations. For example, the customer could select an option to purchase a $50 PIN from AIRTOUCH by touching the appropriate option on touch-screen 204.

In step 418, Easywireless.com prompts the customer at the client terminal to make payment for the requested PIN. Payment can be made by the customer in a number of ways. In the embodiment shown in FIG. 2A, the customer can pay the dealer by cash, credit card, debit card, smart card or any similar method (the customer pays a cashier behind cash register 202). Once the customer pays the dealer, then the dealer must transfer a portion of the payment to Easywireless.com Payment can be apportioned and transferred between the dealer and Easywireless.com by a number of methods. Some example methods:

First method "ACH WALLET": The dealer has a special account set up with Easywireless.com. The dealer stores money in the account before the PIN is purchased. Immediately before a customer purchases one or more PINs, the dealer pays a portion of the payment to Easywireless.com by transferring money from the dealer's account to Easywireless.com by ACH (automated clearing house) electronic funds transfer. This method of payment is referred to as "ACH wallet."

Second method "CREDIT ACCOUNT": The dealer has a credit account with Easywireless.com. The dealer is allowed a predetermined amount of credit based on the creditworthiness of the dealer. When a customer pays for one or more PINs, a portion of the payment is charged to the dealer's credit account. The dealer is then billed later for the amount charged.

Third method: The dealer simply provides credit card information to Easywireless.com. When customer purchases one or more PINs, a portion of the payment is charged to the dealer's credit card.

Fourth method: The customer's credit card information (or debit card, or smart card) is sent directly to Easywireless.com. Easywireless.com then charges the customer's credit card and sends a portion of the payment back to the dealer.

As will be understood by one skilled in the art, the above methods are by example only and there are a multitude of ways that payment can be arranged between the dealer and Easywireless.com. All of these methods do have one thing in common, however. The PIN is sent by Easywireless.com right after a payment is made (either by cash or credit). This makes the delivery of the PIN "on demand" and eliminates costs associated with filled inventory. Because the PIN is sent right after payment is made, the dealer has no costs associated with filled inventory. For example, the dealer does not have to contact Easywireless.com at the beginning of each month and order $10,000 worth of cards. The dealer does not have to predict which cards will be popular, and how many cards to order of each type. Payment for the PIN is charged at the time of each transaction, and thus the dealer has no filled inventory costs.

In the automated kiosk embodiment shown in FIG. 2B, the customer can enter payment by swiping a credit card through credit card receptor 214, or inserting cash into bill receptacle 218 or coin receptacle 220. Using the personal computer of FIG. 2C, the customer can enter payment by typing in his or her credit card information.

After payment has been received and verified in step 418, then in step 420 Easywireless.com server retrieves a PIN from the database having the appropriate characteristics selected by the customer. For example, if the customer chose to purchase a $50 virtual pre-paid phone card for pre-paid cellular telephone service from AIRTOUCH, then Easywireless.com server 102 could retrieve record 312*f* shown in FIG. 3. In step 422, Easywireless.com web server transmits PIN 0948574995 (this PIN is shown in PIN field 306 of exemplary record 312*f* in FIG. 3) to the customer at the client terminal. Once a PIN has been retrieved from PIN database 112 and transmitted to the customer, the PIN record is marked as sold and unavailable from PIN database 112 so that it will not be sent to another customer. Alternatively, the PIN record can be marked as used, so that it will not be retrieved for another customer.

Easywireless.com web server 102 also transmits any instructions necessary to use the PIN. For example, Easywireless.com can transmit a telephone access number which the customer needs to dial before placing a cellular telephone call and entering the PIN. The telephone access number and other instructions will be unique for each provider. These instructions can either be stored in each individual record 312 in PIN database 112, or the instructions can be stored in provider records 124.

The customer could also request to receive multiple PINs. For example, the customer could purchase 3 $50 PINs for AIRTOUCH cellular telephone service. After the customer enters $150 in payment, Easywireless.com server 102 transmits 3 $50 PINs to the customer at the client terminal.

At step 424, the client terminal prints out a receipt for the customer. The receipt includes the requested PIN(s) purchased by the customer, and any instructions for using the PIN such as a telephone access number. The receipt can also contain advertisements. Advertisers pay Easywireless.com for the opportunity to have their ads displayed on receipts. The receipt is a printed piece of paper. Alternatively, the receipt could be in the form of a plastic card. Easywireless.com server 102 then returns back to the first step 400, waiting for the next customer to request to "BEGIN".

Figure 5:
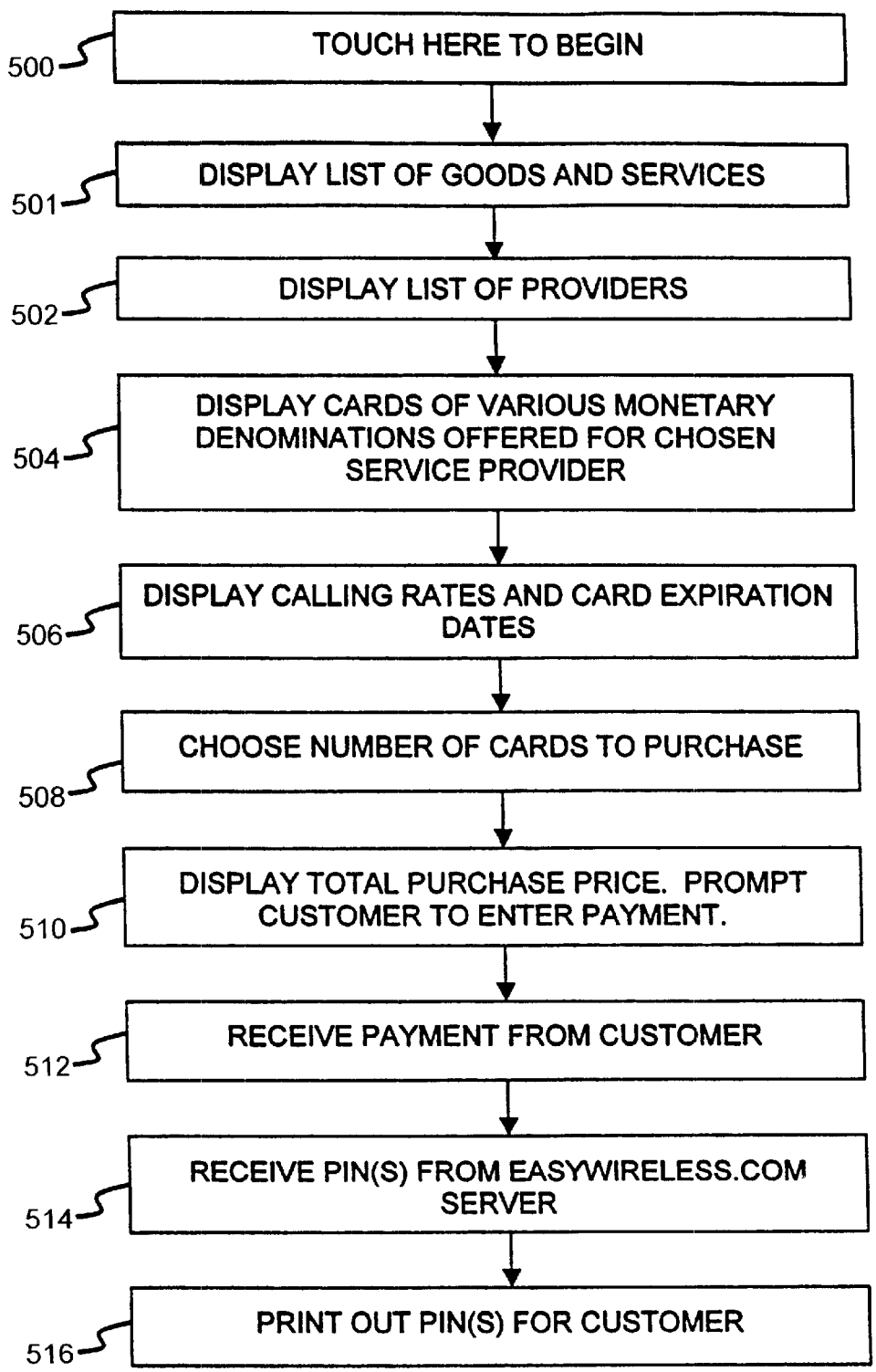
FIG. 5 depicts a flowchart illustrating a method of operating a client terminal of the present invention.

FIG. 5 depicts a flowchart illustrating a method of operation of client terminals 106, 108, 110 (shown in FIG. 1), 200, 210, and 222 (shown in FIG. 2). FIGS. 6–10 show exemplary displays to be shown on the screen of the client terminal. The method of operation will now be described with reference to the flowchart of FIG. 5 and the screens shown in FIGS. 6–10.

In step 500, a window appears which states "TOUCH HERE TO BEGIN." The customer can begin by touching the touch-screen 204 or 212 in the appropriate location. If the customer has accessed the Easywireless.com web server 102 by using personal computer 222, the customer can begin by entering an appropriate URL into the browser (such as http://www.easywireless.com). This would bring the customer to the Easywireless.com web page running on Easywireless.com server 102. The customer could click on a link labeled "BEGIN" to begin the purchase process.

Figure 6:
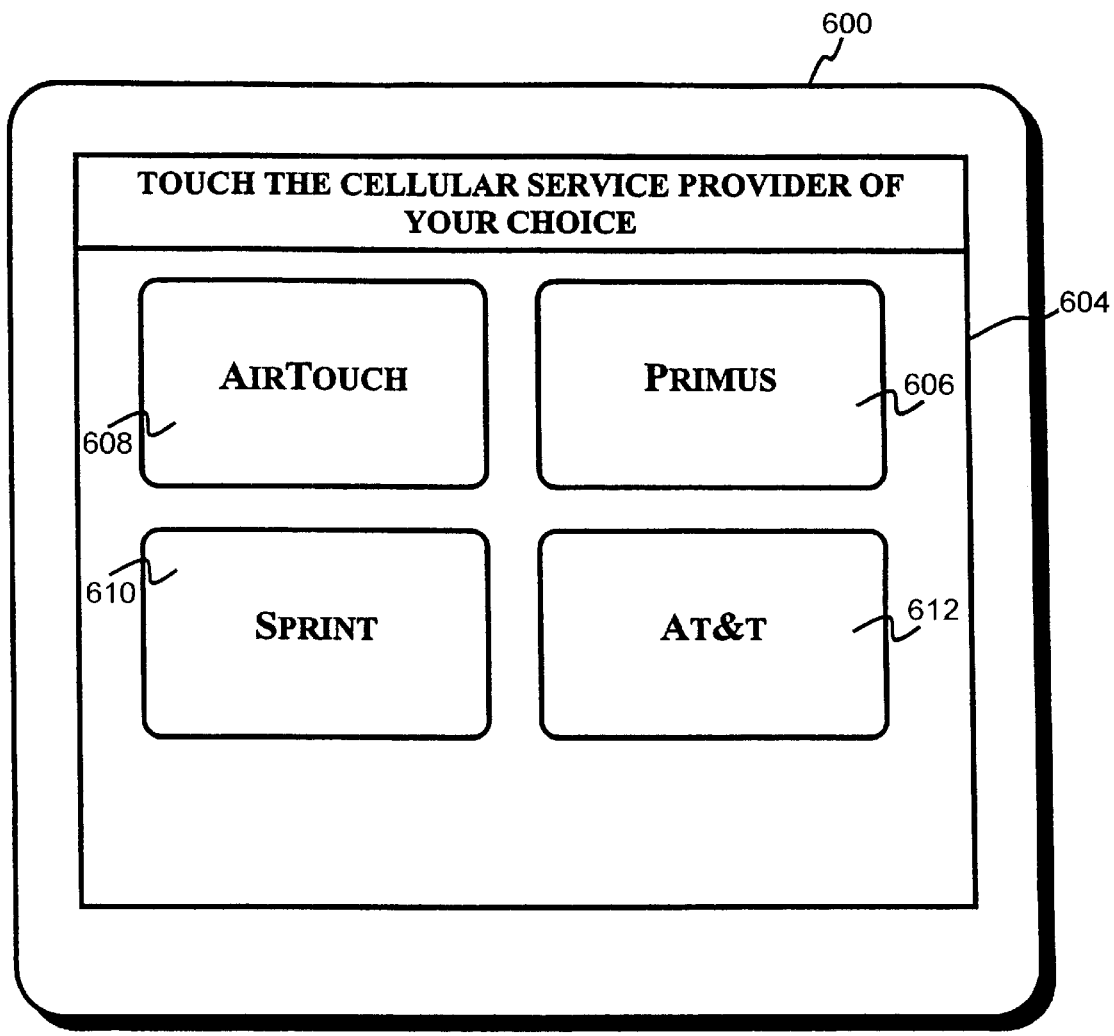
FIG. 6 depicts an example of a display allowing the user to choose a provider.

In step 501, the client terminal displays list of offered goods and services, such as cellular telephone service, gasoline, electricity, dry-cleaning, etc. The customer can then choose one of these goods or services to purchase. Assume, for this example, that the customer has selects "cellular telephone service". In step 502, the customer is provided with a list of providers for the chosen good or service and asked to choose a provider. FIG. 6 shows an exemplary screen corresponding to step 502 (assuming that the customer has selected "cellular telephone service"). Touch-screen 600 displays browser window 604. Four service provider options are shown: AIRTOUCH option 608, PRIMUS option 606, SPRINT option 610 and AT&T option 612. For the purposes of this example, assume that a customer touches AIRTOUCH option 608.

Figure 7:
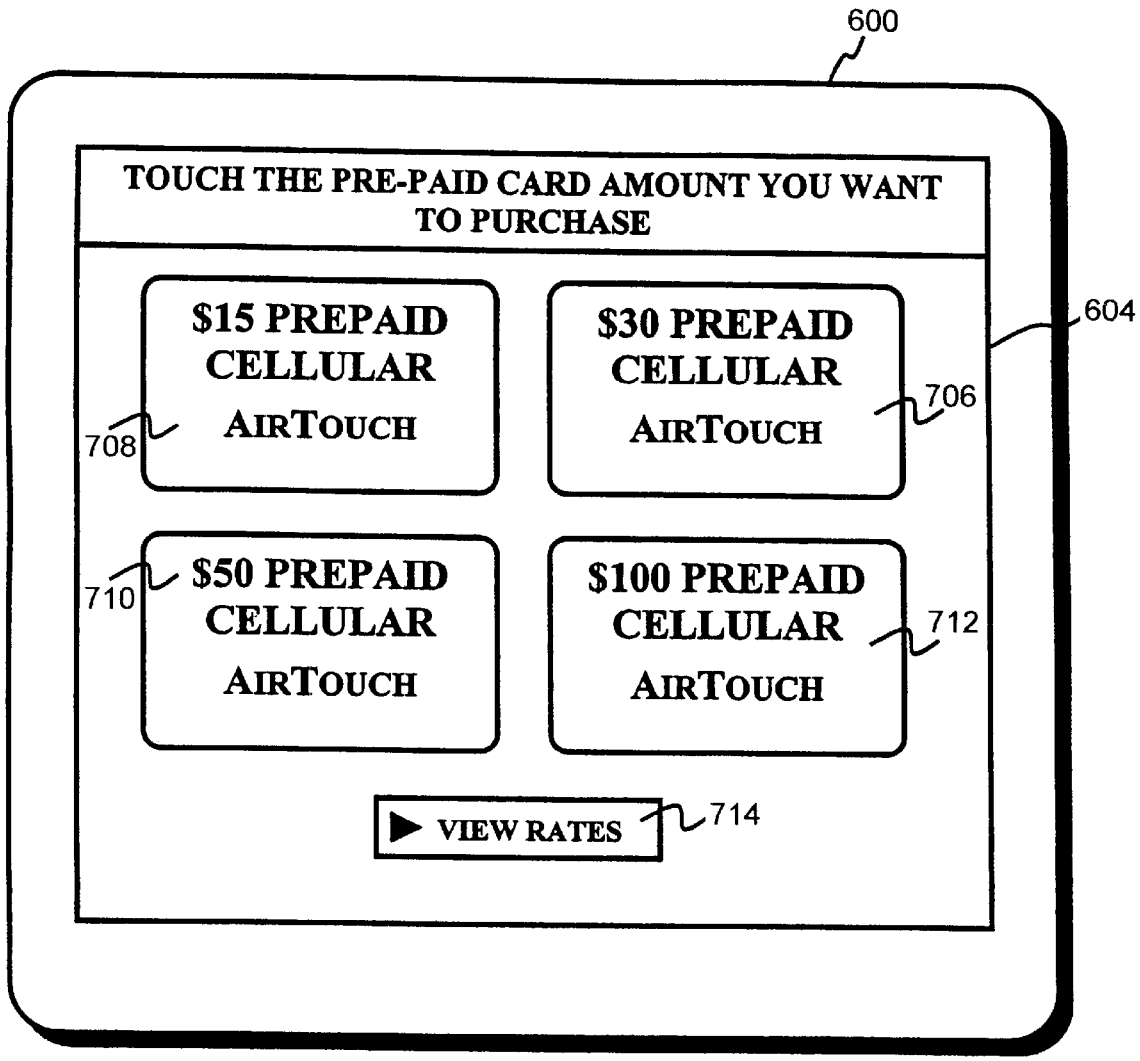
FIG. 7 depicts an example of a display allowing the user to choose a monetary denomination.

In step 504 the display screen displays virtual cards of various monetary options which are offered for the chosen good or service provider (which in this example is AIRTOUCH). FIG. 7 shows an exemplary display screen corresponding to step 504. Four possible monetary denominations may be selected. The customer can choose the $15 option 708, $30 option 706, $50 option 710, or $100 option 712.

Figure 8:
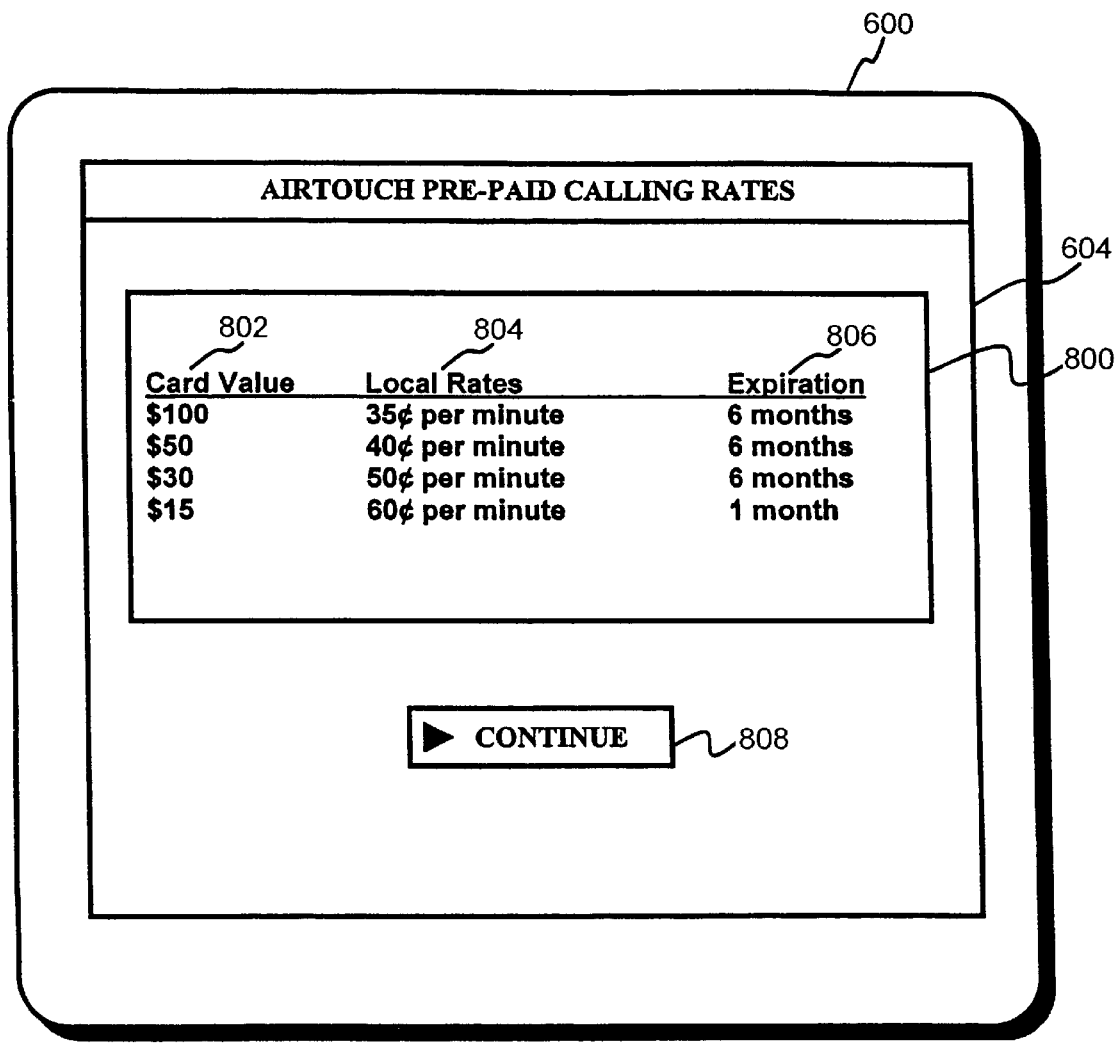
FIG. 8 depicts an example of a display showing the user rate and expiration information.
Figure 9:
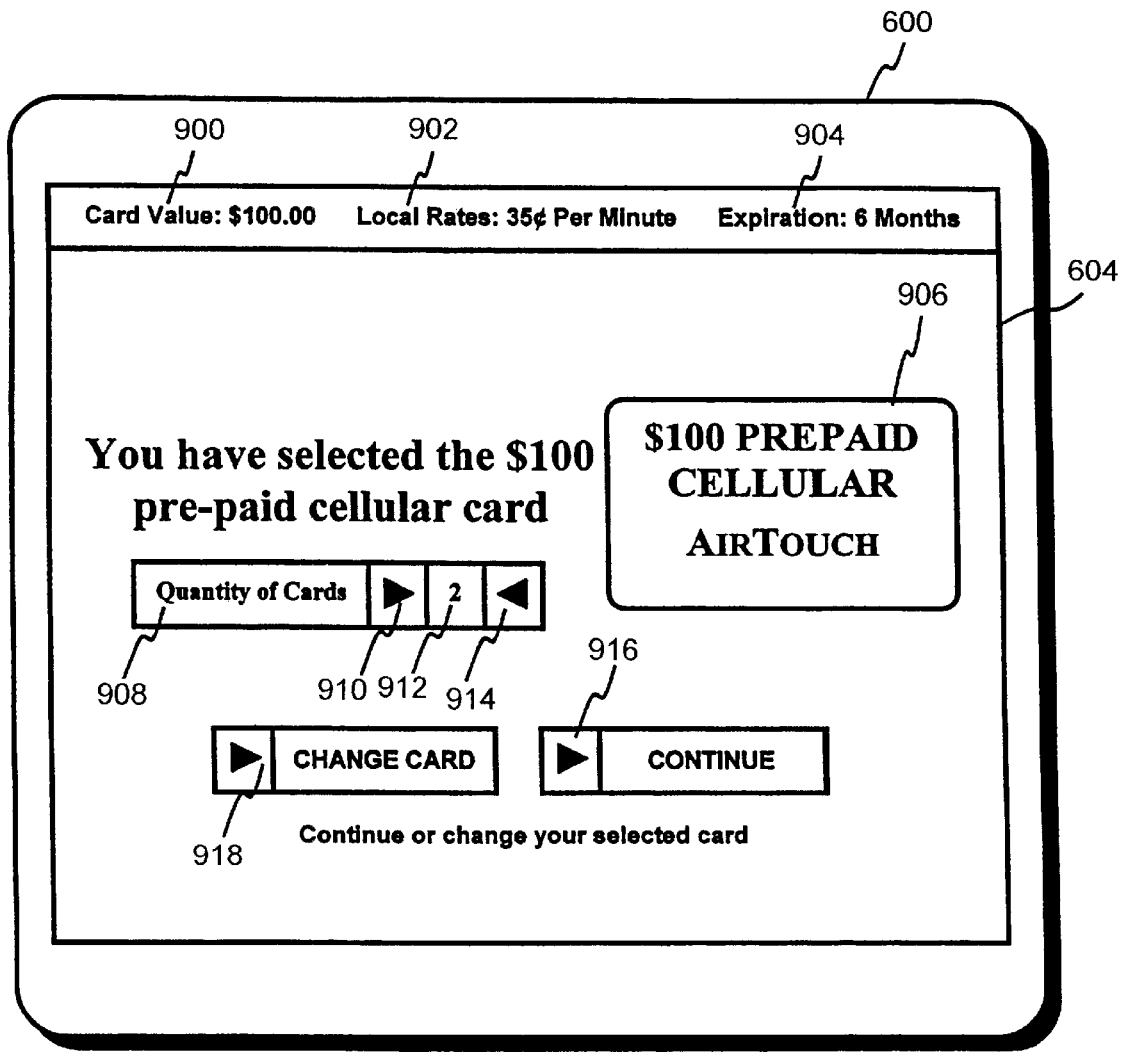
FIG. 9 depicts an example of a display allowing the user to choose a quantity of cards.

In step 506, the display screen displays rate information, if desired by the customer. The customer is given the option of viewing rates by touching the VIEW RATES option 714 shown in FIG. 7. If the customer decides to touch VIEW RATES option 714, then in step 506, the screen displays calling rates, card expiration dates, or any other information applicable to the chosen good or service, or specific to the particular good or service provider chosen. For example, if the customer who has chosen to purchase AIRTOUCH cellular service, touches the VIEW RATES option 714, then FIG. 8 shows an exemplary screen. Information window 800 provides a number of information fields. Card value field 802 displays the various virtual card monetary values offered. Local rates field 804 displays the calling rate per minute for each card value. Expiration field 806 displays the expiration date beyond which the PIN is no longer usable. As shown in FIG. 8, AIRTOUCH offers a discount for higher value card purchases. In other words, the calling rate goes down for higher card value purchases. By touching the continue field 808, the customer can return to the screen shown in FIG. 7.

In FIG. 7, the customer selects a particular monetary denomination offered by touching the screen in an appropriate location. In this example, assume that the customer has chosen the $100 virtual card option 712. This brings up the display shown in FIG. 9. In step 508, the customer is given the choice of how many cards he or she wishes to purchase. The quantity of cards window 908 in FIG. 9 displays the number of virtual cards to be purchased. The customer can touch arrow 910 to increment the number of virtual cards to be purchased. The number of cards to be purchased is shown in box 912. The customer can touch arrow 914 to decrement the number of virtual cards to be purchased. Field 900 and virtual card 906 display the monetary value of the virtual card that was chosen by the customer. Local rates field 902 displays the calling rate for the chosen virtual card. Expiration field 904 displays when the virtual card will expire.

If the customer changes his or her mind, and wishes to purchase a card with a different value, the customer can return to the screen shown in FIG. 7 by touching the CHANGE CARD field 918. Otherwise, the customer can proceed by touching the CONTINUE field 916. This brings up the display shown in FIG. 10A, corresponding to step 510. Field 1000 displays the total purchase price. Since the customer has requested to purchase two pre-paid virtual $100 cards from AIRTOUCH, the total purchase price is $200. Field 1002 instructs the customer to insert payment. This message could alternatively tell the customer to enter credit card information, swipe a credit card, a debit card, a smart card, or pay cash to a cashier depending on the particular client terminal being used and/or a chosen method of payment.

Figure 10A:
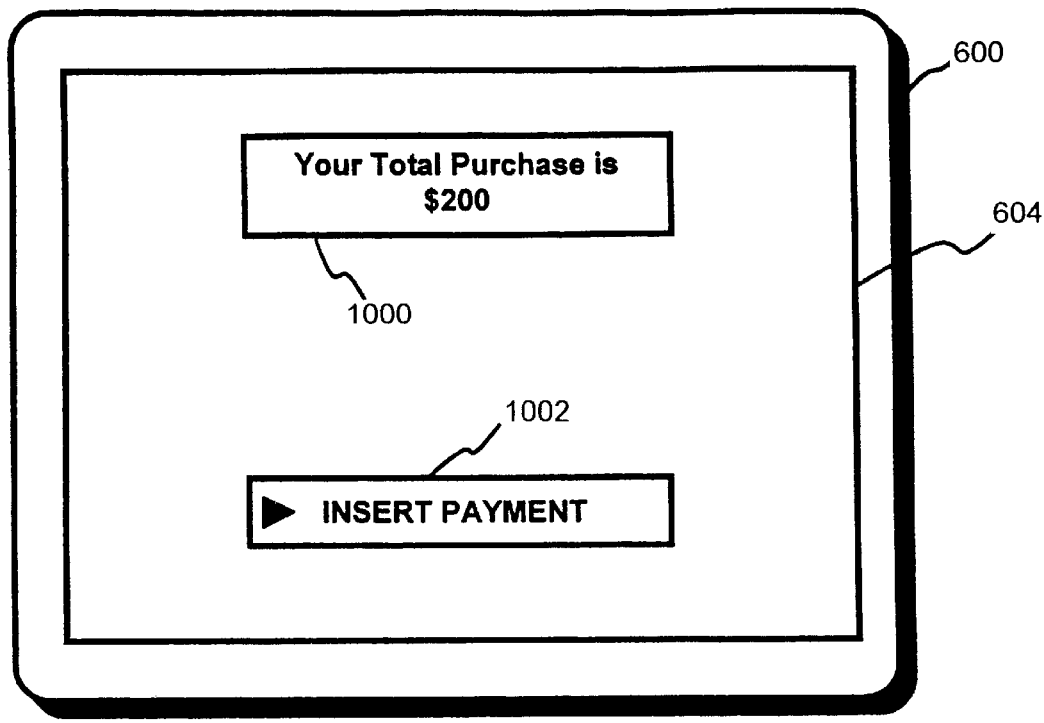
FIG. 10A depicts an example of a display screen requesting payment from the user.
Figure 10B:
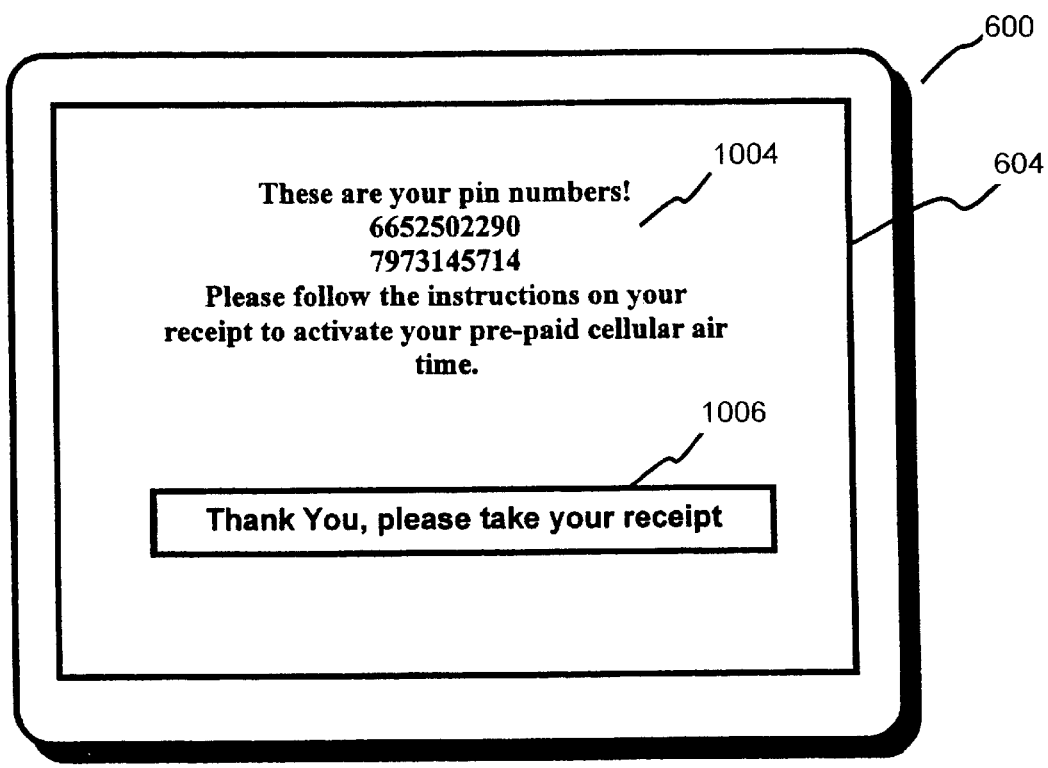
FIG. 10B depicts an example of a display screen showing the user his or her purchased PIN(s).

In step 512, payment is received from the customer. After payment has been received and verified, Easywireless.com server 102 retrieves the requested PIN(s) from PIN database 112 and transmits the requested PIN(s) to the client terminal in step 514. The PIN(s) can be displayed on the screen as shown in FIG. 10*b*, field 1004. Message 1006 informs the customer to take a receipt. A receipt is printed out in step 516. The receipt will contain the requested PIN(s) and any instructions necessary for using the PIN such as an access number to call. If privacy is a concern, it might be preferable not to display the PINs on the screen, but instead to only print the PINs on the receipt.

Figure 11:
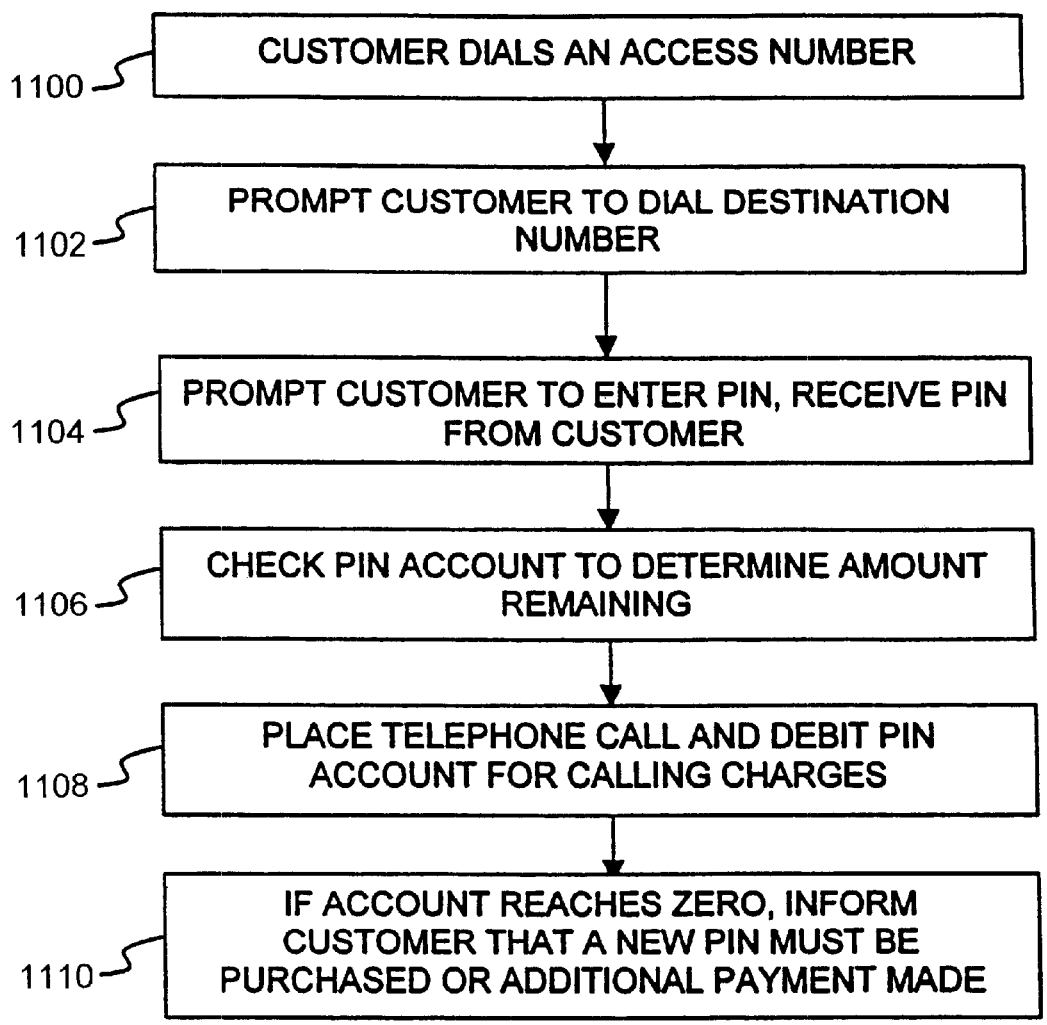
FIG. 11 depicts a flowchart illustrating a method of using a PIN to access telephone service.
Figure 12:
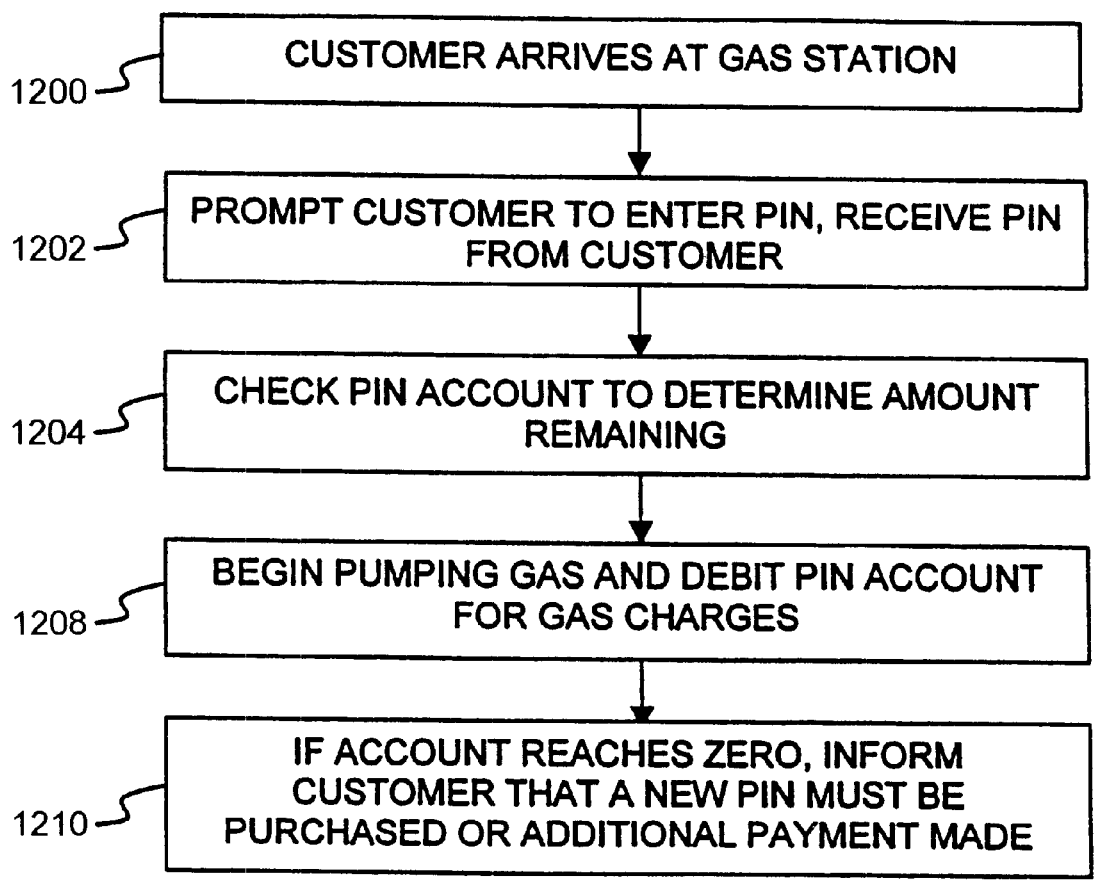
FIG. 12 depicts a flowchart illustrating a method of using a PIN at a gas station.

FIGS. 11 and 12 depict a flowchart illustrating a method of using the PIN once the customer has received the PIN from Easywireless.com server 102. FIG. 11 shows an exemplary method which assumes that the customer has purchased pre-paid telephone service. As an example, assume that a customer has purchased $50 of pre-paid telephone service. A receipt was printed out for the customer providing a PIN and a telephone access number. In step 1100, the customer dials the access number which was provided on the receipt. Typically, the access number is specific to the chosen service provider. For example, if the customer has previously purchased $50 of pre-paid telephone service from AIRTOUCH, the customer will be given an AIRTOUCH access number. When the customer dials the access number, the customer's call will be routed to a switch operated by AIRTOUCH. The access number is preferably a toll-free 1-800 number or a local number. In step 1102, the customer is prompted to dial the destination number that he or she wishes to call. In step 1104, the customer is prompted to enter a PIN which was printed out on the receipt. The customer then dials in his or her PIN. An AIRTOUCH server then checks a PIN account for the entered PIN. In step 1106, the AIRTOUCH server checks to see how much money is remaining in the account. If there is enough money left in the pre-paid account to place the desired call, then the call to the destination number is placed in step 1108. While the call is continuing, the PIN account is debited in accordance with the calling charges. In step 1110, if the account value reaches zero, the customer is informed that a new PIN must be purchased or additional payment must be made. As an option, the customer can be allowed to dial in a credit card number to continue with the call.

FIG. 12 depicts a flowchart illustrating a similar method to FIG. 11. However, FIG. 12 depicts an example where the customer has purchased pre-paid gasoline. For this example, assume that a customer has previously purchased $50 of pre-paid MOBIL gasoline. A receipt was printed out for the customer providing a PIN. In step 1200, the customer arrives at a local MOBIL gas station. The customer uses a keypad and display screen at a self-service pump. The customer pushes a button indicating that he or she wishes to pay with a pre-paid PIN account. In step 102, the customer is prompted to enter a PIN. The customer enters the PIN for which he or she pre-paid. The PIN is sent to a server operated by MOBIL. The server checks a PIN account for that PIN to determine how much money is remaining in the account. If there is money left in the pre-paid account, then the customer is told to begin pumping. The pre-paid PIN account is then debited in accordance with charges for the gasoline pumped. If the account reaches zero, the customer is informed that additional payment must be made.

Easywireless.com server 102 essentially serves as a PIN warehouse. The operators of Easywireless.com server 102 can obtain PINs from various providers in two ways. A first method of obtaining PINs from providers is as follows. PINs are purchased by Easywireless.com directly from the providers. For example, a $10 pre-paid PIN could be purchased from AIRTOUCH at a wholesale price of $8 and then stored in PIN database 112. In other words, AIRTOUCH sells the PIN to Easywireless.com for $8, and Easywireless.com resells the PIN to the customer for $10. Thus, Easywireless.com would make a $2 profit on the sale of the PIN.

A second method of obtaining and selling PINs is as follows. The PINs are received from various providers at no cost to Easywireless.com. Easywireless.com serves as a warehouse for the PINs. After a PIN is sold to a customer, the payment received from the customer is forwarded to the appropriate provider, minus a commission for Easywireless.com.

Another feature of the present invention is the ability to offer discounts. Easywireless.com server 102 can send advertisements and discount offers to the client terminals. Service providers can offer discounts such as "PRE-PAID CELLULAR SERVICE AT 30 CENTS PER MINUTE. 10 CENTS PER MINUTE CHEAPER THAN NORMAL RATE!" Providers will be happy to provide such discounts for pre-paid purchase because there are many advantages to selling pre-paid service. The provider does not have to worry that the customer won't pay his bills, because the calls are pre-paid. The provider does not have to keep track of billing addresses and mailing bills to the customer. The provider gets the money before the call is even made, and thus earns interest on the money. Because of these advantages of pre-paid service, it is often advantageous to providers to offer a discount for pre-paid purchases.

FIGS. 13–16 depicts a purchase ordering feature of the invention. The purchase ordering feature is intended to be used by dealers who wish to purchase a batch of various types of PINs, for the purpose of reselling these PINs to individual customers. The purchase order feature allows a dealer to order a desired assortment of PINs from different providers of different denominations.

Figure 13:
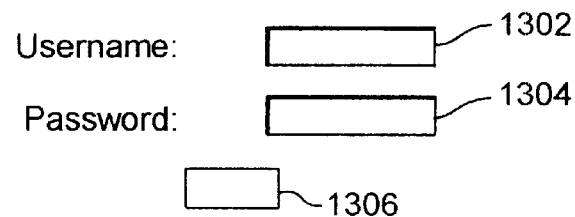
FIG. 13 depicts an example display screen for allowing a user to log-in to a purchase ordering system.

FIG. 13 depicts an example of a login screen for allowing a user to enter the purchase ordering system. To enter the purchase ordering system, the user must be a registered user. Typically, users of the purchase ordering system will be dealers who resell the PINs to other customers. The dealers can buy PINs in bulk, and thus receive a special wholesale discount. As an option, in addition to dealers, preferred customers could be allowed to use the purchase ordering system. A user enters his or her user name in username field 1302 and enters a password in password field 1304. The user then hits the Enter button 1306.

If the user's username and password is recognized as being a registered user, then the purchase order data entry screen is displayed as shown in FIG. 14. Dealer Information field 1402 displays the name, address, and any other pertinent identifying information of the dealer who has logged in to the purchase order data entry system. If other customers besides dealers are allowed to log in to the purchase order data entry system, then field 1402 can be labeled "customer information" or "user information."

Payment method field 1404 displays the payment method and details, such as credit card information, or ACH wallet, etc. Current balance field 1406 displays whether the user has an outstanding balance: i.e. either the dealer owes money to Easywireless.com or has a certain amount of credit remaining.

Table 1407 allows the dealer to many individual purchase orders. Each row of the table represents one individual purchase order. For example, the dealer can order ten $50 cards from AT&T, and 20 $100 cards from Sprint, and 15 $75 cards from Verizon Wireless, etc.

Carrier column 1408 allows the user to select a unique carrier for each purchase order of PINs. Region column 1410 allows the user to select a particular region for each separate purchase order of PINs. Card type column 1412 allows the user to select a particular card monetary denomination for each separate purchase order of PINs. Qty column 1414 allows the user to select a quantity of cards to purchase for each separate purchase order of PINs. Wholesale column 1416 displays the wholesale per-PIN price for each separate purchase order of PINs.

Totals column 1418 displays the total price paid for each purchase order. Totals column 1418 field is simply the wholesale column price 1416 multiplied by the Qty column 1414. Add/Del column 1420 allows the dealer to confirm the addition of each individual purchase order, or to change his mind and delete an entered order. Grand total field 1421 displays the sum of all the individual totals from each individual purchase order.

As an example of an individual purchase order, the first row shown in FIG. 14 indicates that the user has selected one order of Verizon Wireless PINs for the Northwest region. The dealer has ordered five $30 PINs. The dealer is getting a discount, so the dealer only has to pay $25 for the $30 PIN. The total paid for the dealer for that individual purchase order is $250.00. If the dealer changes his mind, and wishes to erase this order, he can do so by clicking "DEL."

If the user wishes to cancel his or her order, the user can click Cancel Order button 1426. If the user wishes to update the price totals shown in column 1418 and field 1421, the user can hit the Update Order button 1422. If the user is satisfied with what he or she has entered, then the user can proceed with the order by clicking the Update Order button 1426. This brings up the Purchase Order Summary screen displayed in FIG. 15.

The Purchase Order Summary screen shown in FIG. 15 allows the user to review his or her entire purchase order and check that everything has been entered correctly. If the user wishes to change something, the user can click Change Purchase Order button 1502. This will take the user back to the Purchase Order Data Entry screen displayed in FIG. 14.

If the user is satisfied with the purchase order summary displayed in FIG. 15, then the user can click Submit P.O. button 1506. The user will automatically be charged by whatever payment method was previously selected (e.g. charged to an on-file credit card, ACH funds transfer, etc.). The user will then get a printed out receipt. A typical receipt is shown in FIG. 17 and will be discussed later.

If the user wishes to pay by an alternate credit card, he or she can click Pay With Alternate Credit Card 1504. This takes the user to the Alternate Credit Card Payment screen shown in FIG. 16. The user can then enter credit card information in the Billing Information fields.

FIG. 18 shows an example of a Prepaid cellular PIN ticket 1800. Ticket 1800 is the receipt that is printed out when an individual user orders a single PIN from Easywireless.com from one of the embodiments shown in FIG. 2 (this receipt is not from the purchase ordering system which has a more elaborate printout shown in FIG. 17).

Figure 19A:
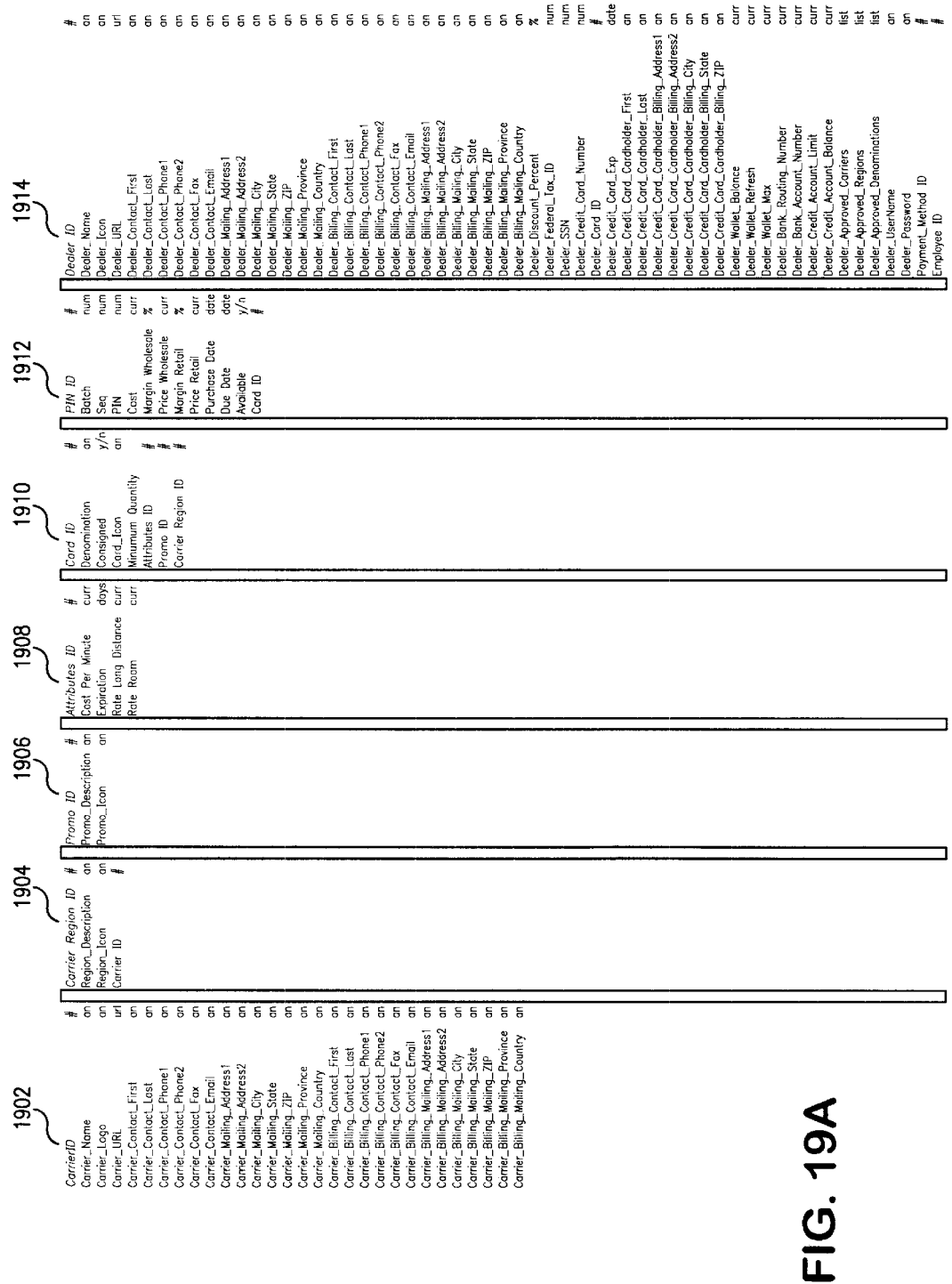

FIGS. 19A and 19B depict another example of a database record in PIN database 112. This example shows a more detailed record than the example record shown in FIG. 3. Carrier ID fields 1902 contains fields providing information pertaining to the individual carrier selected. Carrier region fields 1904 contains fields providing information pertaining to the carrier region selected. Promo ID fields 1906 contains information pertaining to any promotional program(s) that the PIN was purchased under. Attributes fields 1908 contains information pertaining to the PIN attributes such as the calling cost per minute, PIN expiration, long distance rate, and roaming rate. Card ID fields 1910 contains various identification fields associated with the PIN. PIN ID fields 1912 contain fields providing information pertaining to PIN identification. Dealer ID fields 1914 contain information pertaining to the dealer where the PIN is purchased. When a PIN is purchased at a dealer, Dealer ID fields 1914 gets filled in with the corresponding dealer information. Sub/kiosk ID fields 1916 contain information pertaining to a kiosk where the PIN is purchased. When a PIN is purchased, these fields get filled in with the kiosk information associated with the kiosk where the PIN was purchased. POS Type ID fields 1918 contain additional information pertaining to kiosk identification. Payment_method ID fields 1920 contain information pertaining to the method of payment. Credit Card ID fields 1922 contain credit card information, if the PIN was purchased by credit card. Lastly, Employee ID fields 1924 contain information pertaining to an Easywireless.com employee who may have made the PIN sale, and any commission which the employee receives for the sale.

Every PIN in PIN database 112 has its own associated record, as shown in FIGS. 19A and 19B. The records shown in FIGS. 19A and 19B are directed towards wireless telephone service. However, different types of records can be used which are tailored to the product or service being sold, such as gasoline. Each PIN has its own associated record as shown in FIGS. 19A and 19B, even before the PIN is purchased. Every time a new PIN is created in the system, a new record is made. When the PIN is purchased by a customer or dealer, the information about the sale is filled in to the appropriate fields in the record, and the record is marked as sold so that the PIN is not resold to another customer or dealer.

Another alternative feature of the present invention is selling PINs for bundled goods and services. Instead of buying a PIN for a specific service, such as cellular telephone service, the customer buys a PIN for general bundled account. This PIN could allow the customer to purchase magazines, newspapers, place telephone calls, or ride the subway all using the same PIN.

In addition to selling individual pre-paid goods and services, Easywireless.com could sell bundled pre-paid goods and services.

Although the present invention has been described in terms of various embodiments, it is not intended that the invention be limited to these embodiments. Modification within the spirit of the invention will be apparent to those skilled in the art. For example, a touch-screen is not necessary. The customer can enter all selections by using a keyboard, keypad, voice commands, or any other input device. The scope of the present invention is defined by the claims that follow.

What is claimed is:

1. A method of providing a personal identification number (PIN) to a client terminal, comprising:
   receiving a request for a PIN over a network, the request originating from a user at a client terminal, the request associated with a requested monetary unit and a requested provider selected from among a set of available providers;
   retrieving from a database a PIN associated with the requested monetary unit and requested provider;
   transmitting the retrieved PIN to the client terminal over the network, wherein the PIN is transmitted to the client terminal on-demand in response to the user's request.

2. The method of claim 1, wherein no inventory of PINs is stored at the client terminal.

3. The method of claim 1, wherein the request for a PIN over a network, and the transmission of the PIN to the client terminal over the network are by secure transmissions.

4. The method of claim 1, wherein the PIN is used for accessing pre-paid telephone service and the provider is a telephone service provider.

5. The method of claim 1, further comprising:
   transmitting to the client terminal a plurality of products or services available; and
   receiving from a user at the client terminal a selection of one of the available products or services.

6. The method of claim 5, further comprising:
   transmitting to the client terminal a plurality of provider names for the requested product or service; and
   receiving from a user at the client terminal a selection of one of the available provider names.

7. The method of claim 6, further comprising:
   transmitting to the client terminal a plurality of monetary denominations available for the requested provider; and
   receiving from the client terminal a selection of one of the available monetary denominations.

8. The method of claim 7, further comprising:
   transmitting to the client terminal a plurality of regions available for the requested provider; and
   receiving from the client terminal a selection of the one of the available regions.

9. The method of claim 1, further comprising:
   receiving a request from the client terminal to view rate information; and
   transmitting rate information to the client terminal.

10. The method of claim 1, further comprising:
    prompting the user at the client terminal to enter payment for the requested PIN.

11. The method of claim 1, wherein a user enters payment by one of:
    a) inserting cash into a receptacle at the client terminal;
    b) entering credit card or debit card or smart card information or swiping a card through a receptacle; and
    c) paying cash to an operator associated with the client terminal.

12. The method of claim 1, wherein a dealer remits a portion of the payment to an account associated with the server by one of:

a) transferring funds from a dealer's account into the account associated with the server by an electronic funds transfer;

b) charging a portion of the payment to a dealer's credit account; and c) charging a portion of the payment to a dealer's credit card.

13. The method of claim 1, further including:

printing a receipt for the user, the receipt including the requested PIN number.

14. The method of claim 13, wherein the receipt includes instructions for placing a telephone call using the PIN number.

15. The method of claim 1, wherein the PIN has an expiration date.

16. The method of claim 1, wherein the client terminal is an automated kiosk.

17. The method of claim 1, wherein the client terminal uses a touch-screen interface.

18. The method of claim 1, further including a purchase ordering method, comprising:

receiving a plurality of individual purchase orders from the user, each individual purchase order associated with a requested provider, a requested monetary denomination, and a requested number of PINs.

19. The method of claim 18, wherein the user of the purchase ordering method receives a wholesale discount.

20. A system for providing a personal identification number (PIN) to a user, comprising:

a server receiving a request for a PIN over a network, the request originating from a user at a client terminal, the request associated with a requested monetary unit and a requested provider selected from among a set of available providers;

a database located on the server;

wherein the server retrieves from the database a PIN associated with the requested monetary unit and requested provider, and transmits the PIN to the client terminal over the network on-demand in response to the user's request.

21. A system for providing personal identification numbers (PINs), comprising:

a server coupled to a network, the server receiving a request for a PIN, the request received over the network originating from a client terminal wherein the request includes a provider selected from among a set of available providers;

a database located on the server, the database containing PINs, wherein the server retrieves a PIN from the database in response to receiving the request, and transmits the retrieved PIN on-demand to the client terminal in response to said request from said client terminal.

22. The system of claim 21, wherein the database contains a plurality of PINs for a plurality of providers, and the user requests a PIN for a specific provider.

23. The system of claim 21, wherein the database contains a plurality of PINs for a plurality of providers, each PIN associated with a specific monetary value, and the user requests a PIN for a specific provider of a specific monetary value.

24. The system of claim 21, further including:

a printer located in or near said user terminal, said printer printing out the PIN for the user when received from said server.

25. Computer executable software code stored on a computer readable medium, performing a method for providing a personal identification number (PIN) to a client terminal, comprising:

receiving a request for a PIN over a network, the request originating from a user at a client terminal, the request associated with a requested monetary unit and a requested provider selected from among a set of available providers;

retrieving from a database a PIN associated with the requested monetary unit and requested provider;

transmitting the retrieved PIN to the client terminal over the network, wherein the PIN is transmitted to the client terminal on-demand in response to the user's request.

26. A system for providing personal identification numbers (PINs), comprising:

a database containing PINs associated with a plurality of available products and services wherein certain of said products and services are available in a plurality of monetary denominations;

a server in communication with the database, the server receiving a request for a PIN transmitted over a network from a client terminal wherein the request indicates user selection of a selected one of said products and services and a selected one of said plurality of monetary denominations;

wherein the server retrieves a PIN from the database in response to receiving the request, and transmits the retrieved PIN on-demand to the client terminal in response to said request from said client terminal.

27. The system of claim 1 wherein the server is operative to transmit to the client terminal a plurality of available provider names for said selected one of said products and services and to receive from the client terminal a selection of one of the available provider names.

* * * * *

UNITED STATES PATENT AND TRADEMARK OFFICE
CERTIFICATE OF CORRECTION

PATENT NO.    : 6,526,130 B1
DATED         : February 25, 2003
INVENTOR(S)   : Miles Paschini It is certified that error appears in the above-identified patent and that said Letters Patent is hereby corrected as shown below:

Column 18,
Line 49, change "claim 1" to -- claim 26 --.

Signed and Sealed this

Ninth Day of September, 2003

JAMES E. ROGAN
*Director of the United States Patent and Trademark Office*